US012606234B2

(12) United States Patent      (10) Patent No.:   US 12,606,234 B2
Chowdhury et al.      (45) Date of Patent:   *Apr. 21, 2026

(54) SYSTEMS AND METHODS FOR DISTRIBUTED WINDING PASSIVE DAMPING IN A STEER BY WIRE HANDWHEEL ACTUATOR

(71) Applicant: STEERING SOLUTIONS IP HOLDING CORPORATION, Saginaw, MI (US)

(72) Inventors: Anik Chowdhury, Auburn Hills, MI (US); Michael J. Bock, Saginaw, MI (US); Shuvajit Das, Sterling Heights, MI (US); Steven J. Collier-Hallman, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 51 days.

This patent is subject to a terminal disclaimer.

(21) Appl. No.: 18/588,649

(22) Filed: Feb. 27, 2024

(65) Prior Publication Data

US 2024/0286669 A1     Aug. 29, 2024

Related U.S. Application Data

(60) Provisional application No. 63/448,804, filed on Feb. 28, 2023.

(51) Int. Cl.
*B62D 5/00*     (2006.01)

(52) U.S. Cl.
CPC .................................... *B62D 5/005* (2013.01)

(58) Field of Classification Search
CPC ...... B62D 5/005; B60W 2710/20–207; B60W 2510/20–207; B60W 10/20
USPC ........................................................ 388/808
See application file for complete search history.

(56) References Cited

U.S. PATENT DOCUMENTS

| | | | |
|---|---|---|---|
| 9,748,878 B1 * | 8/2017 | Susanto ................. | H02P 6/182 |
| 11,128,241 B2 | 9/2021 | Hossain et al. | |
| 2020/0321893 A1 * | 10/2020 | Hossain ................. | B62D 5/046 |
| 2021/0044170 A1 * | 2/2021 | Okamoto ................. | H02K 3/50 |

* cited by examiner

*Primary Examiner* — Logan M Kraft
*Assistant Examiner* — Joshua Campbell
(74) *Attorney, Agent, or Firm* — Dickinson Wright PLLC

(57) ABSTRACT

A method for passive damping in a steer-by-wire handwheel actuator includes selecting a number of windings for a motor of a handwheel actuator; shorting a subset of windings of the number of windings, each winding of the subset of windings being disposed at an obtuse angle from each other winding of the subset of windings; determining a resistance value for the motor; selectively adjusting the resistance value based on a number of windings associated with the subset of windings; and providing, in series with the subset of windings, at least one metal-oxide-semiconductor field-effect transistor (MOSFET) configured to: vary the resistance associated with the subset of windings based on a vehicle speed; and tune a damping characteristic associated with the handwheel actuator.

20 Claims, 47 Drawing Sheets

HANDWHEEL

COLUMN

INTERMEDIATE SHAFT

TORSION BAR

COUPLING WORM GEAR

HWA Motor

REMOVED

PINION

RWA Motor

COUPLING BALLNUT

RACK

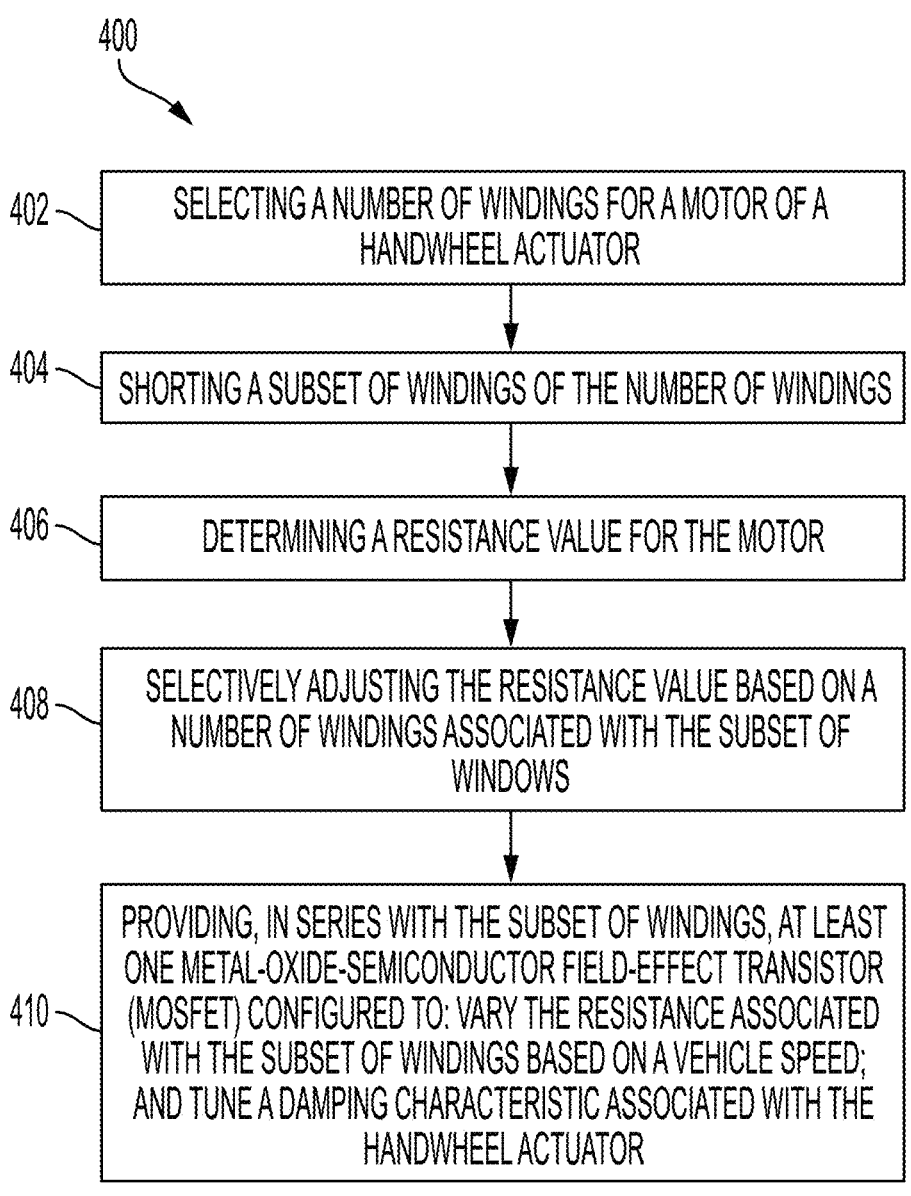

400

402 — SELECTING A NUMBER OF WINDINGS FOR A MOTOR OF A HANDWHEEL ACTUATOR

404 — SHORTING A SUBSET OF WINDINGS OF THE NUMBER OF WINDINGS

406 — DETERMINING A RESISTANCE VALUE FOR THE MOTOR

408 — SELECTIVELY ADJUSTING THE RESISTANCE VALUE BASED ON A NUMBER OF WINDINGS ASSOCIATED WITH THE SUBSET OF WINDOWS

410 — PROVIDING, IN SERIES WITH THE SUBSET OF WINDINGS, AT LEAST ONE METAL-OXIDE-SEMICONDUCTOR FIELD-EFFECT TRANSISTOR (MOSFET) CONFIGURED TO: VARY THE RESISTANCE ASSOCIATED WITH THE SUBSET OF WINDINGS BASED ON A VEHICLE SPEED; AND TUNE A DAMPING CHARACTERISTIC ASSOCIATED WITH THE HANDWHEEL ACTUATOR

FIG. 6

HAIRPIN

DELTA CONNECTION

| Average Torque (Nm) | Torque ripple % |
|---|---|
| 4.05 | 3.45 |

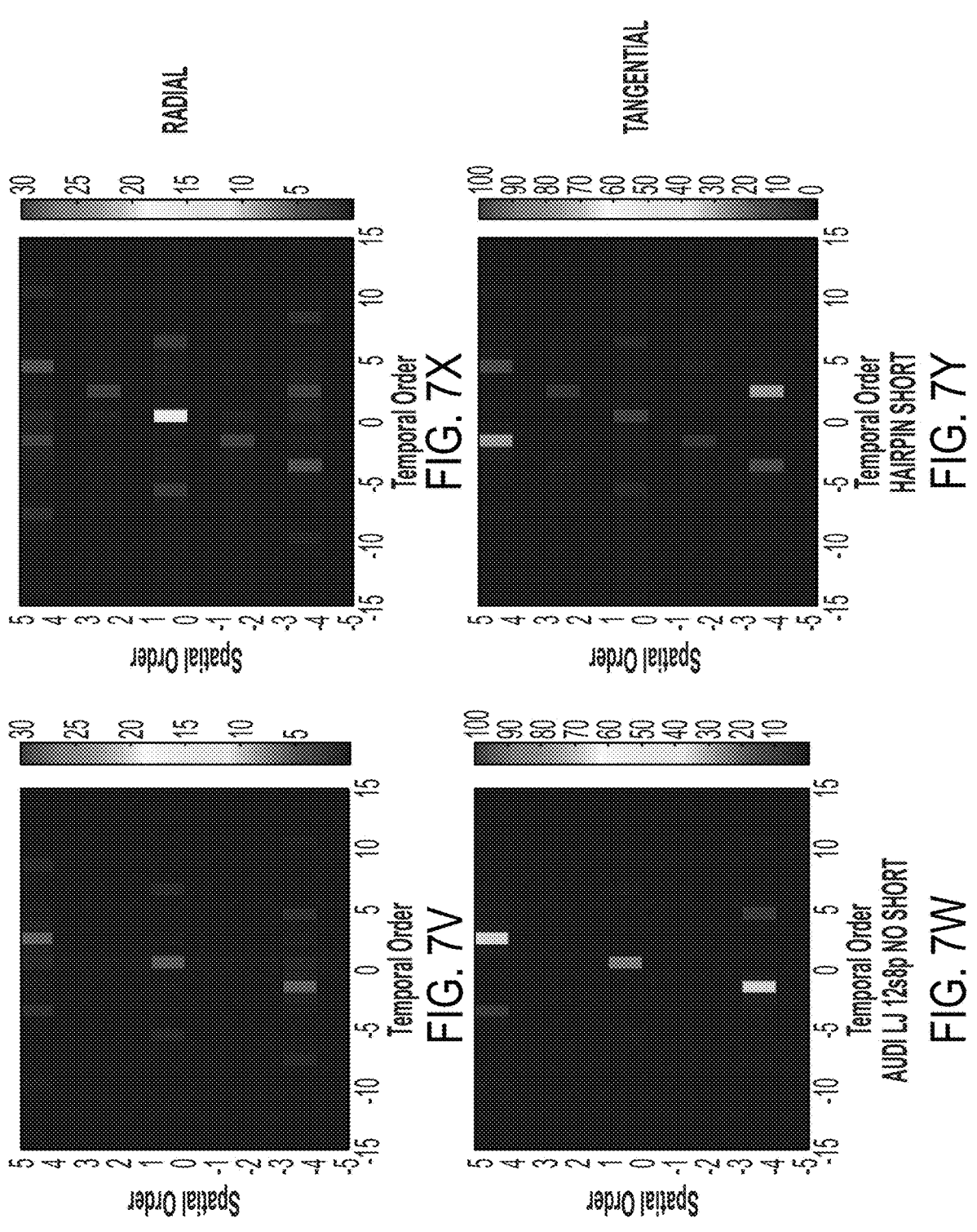

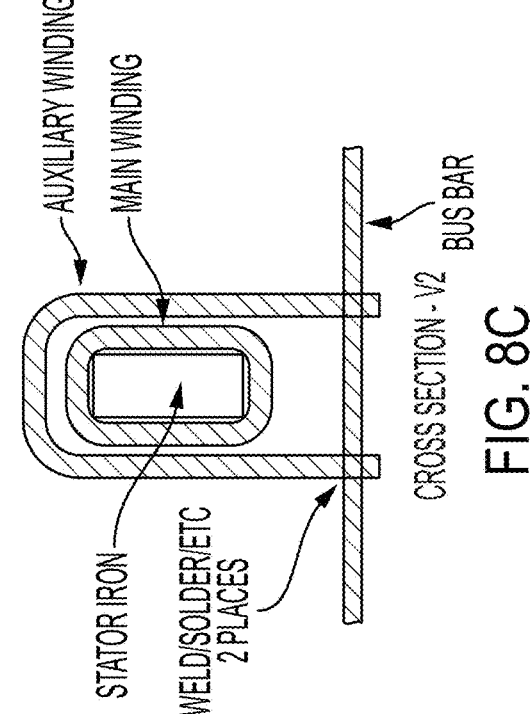
HAIRPIN WINDING
STATOR IRON 1 OF n TEETH
AUXILIARY WINDING "HAIR-PIN"
MAIN WINDING
8B
8B
PLAN VIEW
FIG. 8A
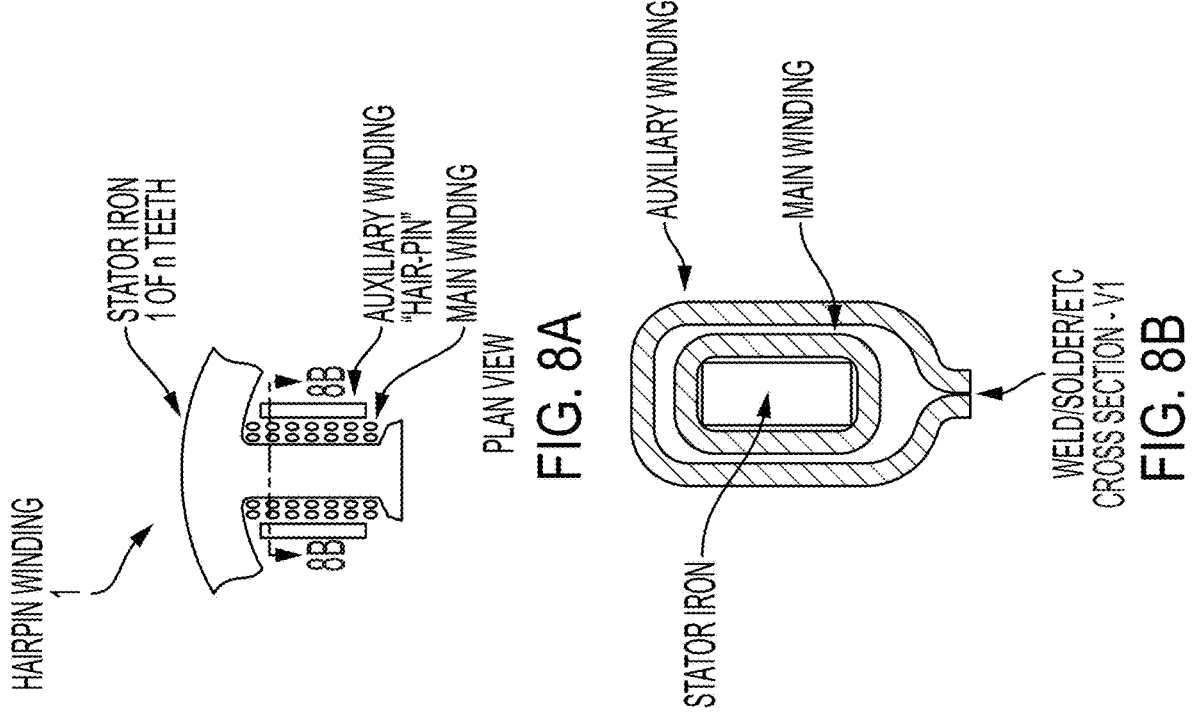
AUXILIARY WINDING
MAIN WINDING
STATOR IRON
AUXILIARY WINDING
MAIN WINDING
STATOR IRON
WELD/SOLDER/ETC 2 PLACES
BUS BAR
CROSS SECTION - V2
FIG. 8C
WELD/SOLDER/ETC CROSS SECTION - V1
FIG. 8B

CROSS SECTION - V3

AUXILIARY WINDING WITH 2 COILS ON TOOTH

MAIN WINDING

AUXILIARY WINDING

PLAN VIEW

FIG. 8E

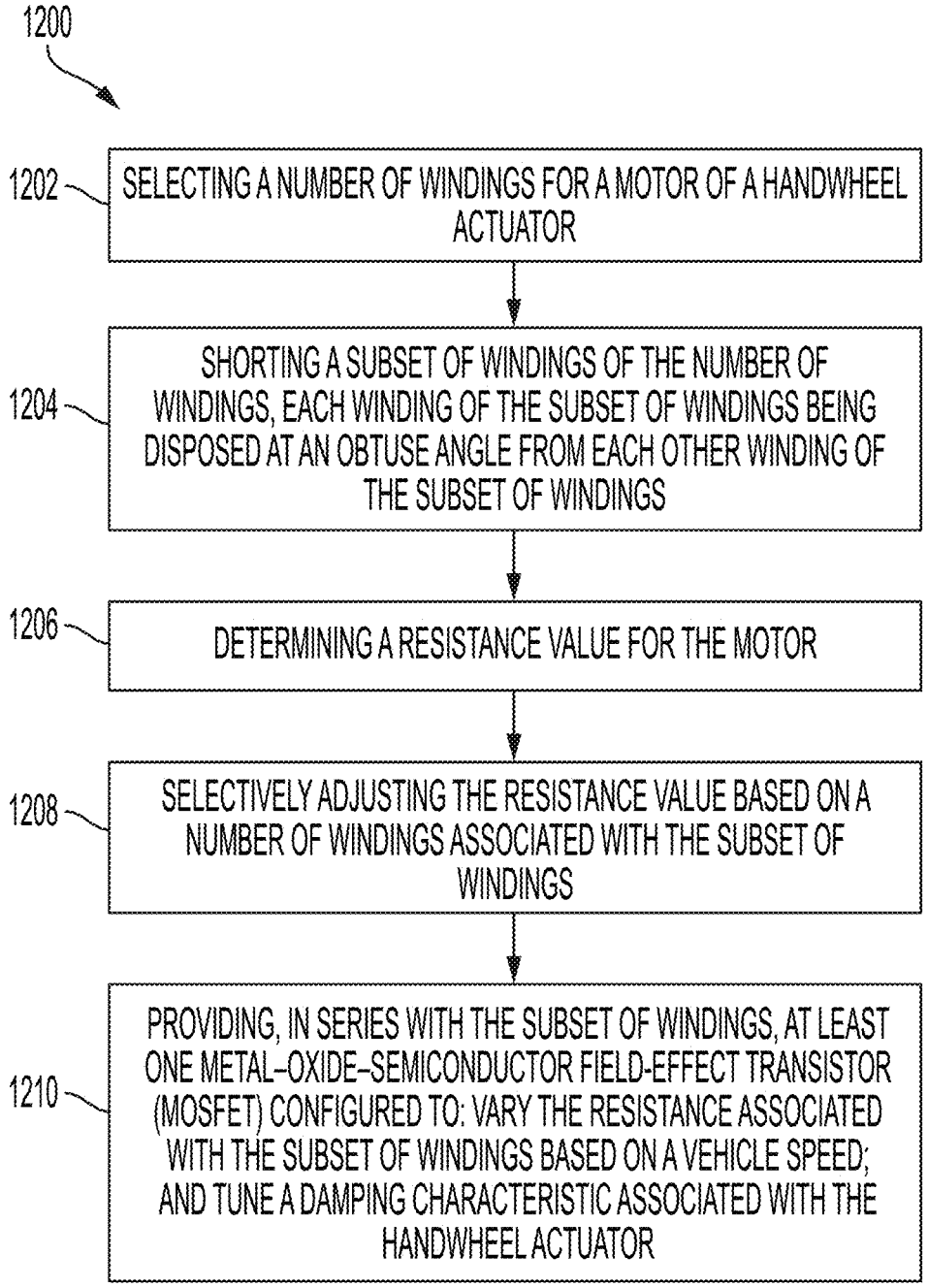

1200

1202 — SELECTING A NUMBER OF WINDINGS FOR A MOTOR OF A HANDWHEEL ACTUATOR

1204 — SHORTING A SUBSET OF WINDINGS OF THE NUMBER OF WINDINGS, EACH WINDING OF THE SUBSET OF WINDINGS BEING DISPOSED AT AN OBTUSE ANGLE FROM EACH OTHER WINDING OF THE SUBSET OF WINDINGS

1206 — DETERMINING A RESISTANCE VALUE FOR THE MOTOR

1208 — SELECTIVELY ADJUSTING THE RESISTANCE VALUE BASED ON A NUMBER OF WINDINGS ASSOCIATED WITH THE SUBSET OF WINDINGS

1210 — PROVIDING, IN SERIES WITH THE SUBSET OF WINDINGS, AT LEAST ONE METAL–OXIDE–SEMICONDUCTOR FIELD-EFFECT TRANSISTOR (MOSFET) CONFIGURED TO: VARY THE RESISTANCE ASSOCIATED WITH THE SUBSET OF WINDINGS BASED ON A VEHICLE SPEED; AND TUNE A DAMPING CHARACTERISTIC ASSOCIATED WITH THE HANDWHEEL ACTUATOR

FIG. 12

SYSTEMS AND METHODS FOR DISTRIBUTED WINDING PASSIVE DAMPING IN A STEER BY WIRE HANDWHEEL ACTUATOR

CROSS-REFERENCES TO RELATED APPLICATIONS

This patent application claims priority to U.S. Provisional Patent Application Ser. No. 63/448,804, filed Feb. 28, 2023 which is incorporated herein by reference in its entirety.

TECHNICAL FIELD

This disclosure related to steering systems, and in particular to systems and methods for distributed winding passive damping in a steer-by-wire handwheel actuator.

BACKGROUND

Vehicles, such as cars, trucks, sport utility vehicles, crossovers, mini-vans, marine craft, aircraft, all-terrain vehicles, recreational vehicles, or other suitable vehicles, include a steering system, such as an electronic power steering (EPS) system, a steer-by-wire (SbW) steering system, a hydraulic steering system, or other suitable steering system. The steering system typically includes one or more controllers that control various aspects of the steering system including, but not limited to, controlling one or more electric motors and/or one or more actuators of the steering system.

SUMMARY

This disclosure relates generally to steering systems.

An aspect of the disclosed embodiments includes a method for passive damping in a handwheel actuator. The method includes selecting a number of windings for a motor of a handwheel actuator, and shorting a subset of windings of the number of windings, each winding of the subset of windings being disposed at an obtuse angle from each other winding of the subset of windings. The method also includes determining a resistance value for the motor, selectively adjusting the resistance value based on a number of windings associated with the subset of windings, and providing, in series with the subset of windings, at least one metal-oxide-semiconductor field-effect transistor (MOSFET) configured to: vary the resistance associated with the subset of windings based on a vehicle speed; and tune a damping characteristic associated with the handwheel actuator.

Another aspect of the disclosed embodiments includes a system for passive damping in a handwheel actuator. The system includes a processor, and a memory. The memory includes instructions that, when executed by the processor, cause the processor to: select a number of windings for a motor of a handwheel actuator; short a subset of windings of the number of windings, each winding of the subset of windings being disposed at an obtuse angle from each other winding of the subset of windings; determine a resistance value for the motor; selectively adjust the resistance value based on a number of windings associated with the subset of windings; and provide, in series with the subset of windings, at least one metal-oxide-semiconductor field-effect transistor (MOSFET) configured to: vary the resistance associated with the subset of windings based on a vehicle speed; and tune a damping characteristic associated with the handwheel actuator.

An aspect of the disclosed embodiments includes an apparatus for passive damping in a handwheel actuator. The apparatus includes a processor, and a memory. The memory includes instructions that, when executed by the processor, cause the processor to: short a subset of windings of selected number of windings of a motor of a handwheel actuator, each winding of the subset of windings being disposed at an obtuse angle from each other winding of the subset of windings; selectively adjusting a resistance value of the motor based on a number of windings associated with the subset of windings; and providing, in series with the subset of windings, at least one metal-oxide semiconductor field-effect transistor (MOSFET) configured to vary the resistance associated with the subset of windings based on a vehicle speed.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 6 is a flow diagram generally illustrating a passive damping method according to the principles of the present disclosure.

FIGS. 8A-8E generally illustrate various aspects of a motor characteristics according to the principles of the present disclosure.

FIG. 12 is a flow diagram generally illustrating an alternative passive damping method according to the principles of the present disclosure.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, marine craft, aircraft, all-terrain vehicles, recreational vehicles, or other suitable vehicles, include a steering system, such as an electronic power steering (EPS) system, a steer-by-wire (SbW) steering system, a hydraulic steering system, or other suitable steering system. The steering system typically includes one or more controllers that control various aspects of the steering system including, but not limited to, controlling one or more electric motors and/or one or more actuators of the steering system.

Figure 3:
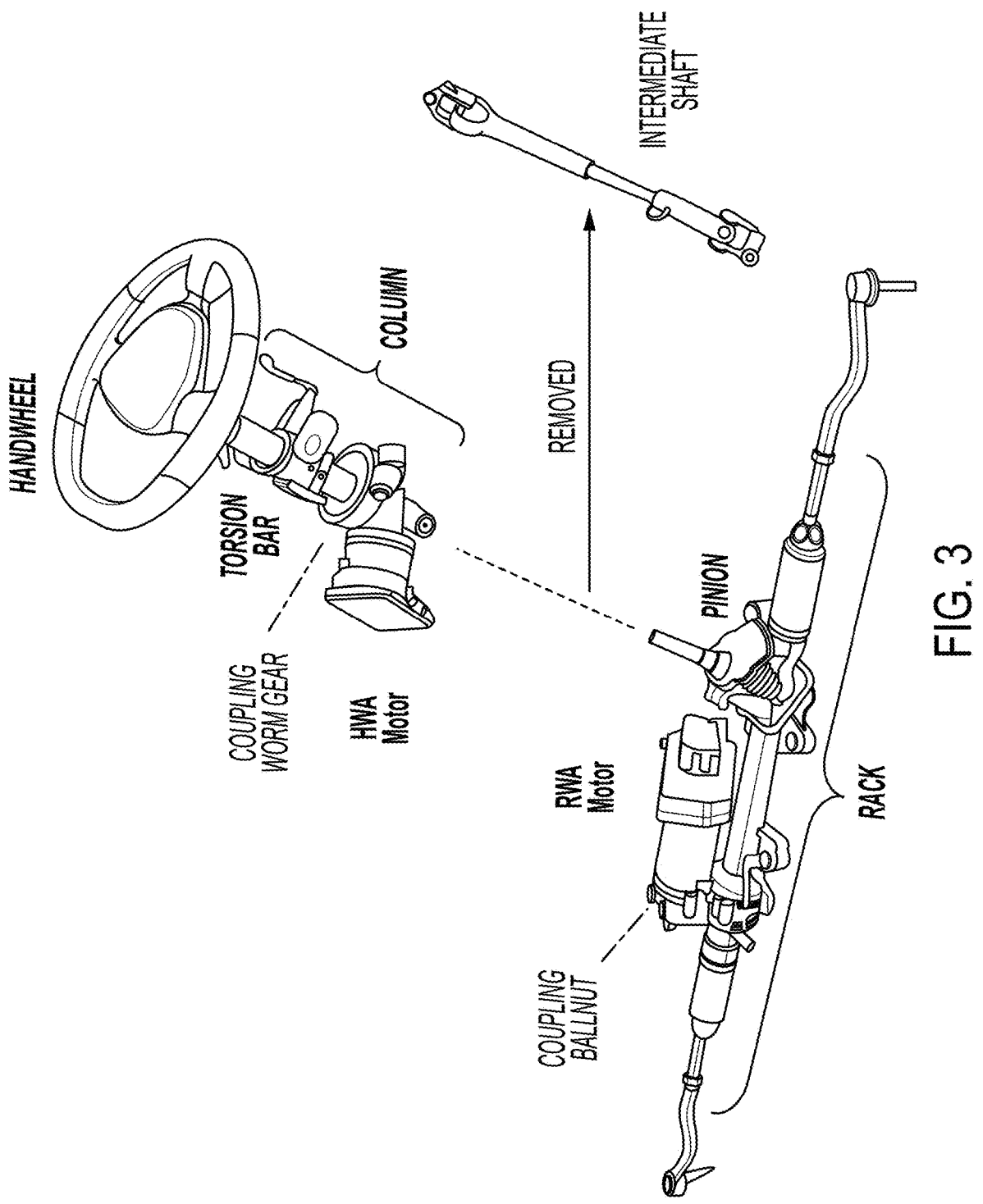
FIG. 3 generally illustrates a steering system according to the principles of the present disclosure.

Permanent magnet synchronous machines (e.g., or motors) (PMSM) are used in a variety of automotive applications ranging from steering to traction for their high torque and power densities. Electric power steering (EPS) and steer by wire (SbW) systems also see the application of PMSMs. The SbW system is an evolution of the EPS system where there is no mechanical coupling between the handwheel and the steering rack. The SbW system typically consists of two actuators: handwheel actuators (HWA) and roadwheel actuators (RWA), as is generally illustrated in FIG. 3. The SbW handwheel actuator (HWA) is typically involved in second quadrant motor operation, which may provide a feedback torque, as opposed to assist torque in an EPS system, to the driver (e.g., or operator) to ensure realistic steering feel. Because of the absence of mechanical coupling with the road wheels, the SbW system suffers from low damping under power failure and/or off condition. Absence of damping under such a condition may cause a severe safety concern. SbW HWA damping can be increased through active and/or passive means.

Fault-tolerant behavior requirements of motors in steering systems are generally met by using dual electronic control units (ECU) or by the use of dual motors on a single shaft. For example, FIG. 4A generally illustrates a 9 slot 6 pole (9/6) surface mounted PMSM (SPMSM) with three ECUs and FIG. 4B generally illustrates a 12 slot 8 pole (12/8) SPMSM with dual ECUs. The 9/6 SPMSM may be wound to have dual ECUs. However, mutual coupling between the ECUs may need to be accounted for in such a case. Mutual coupling between two sets of windings in a 9/6 may be reduced by strategic neutral point separation for a wye-connected winding set.

Figures 4A, 4B:
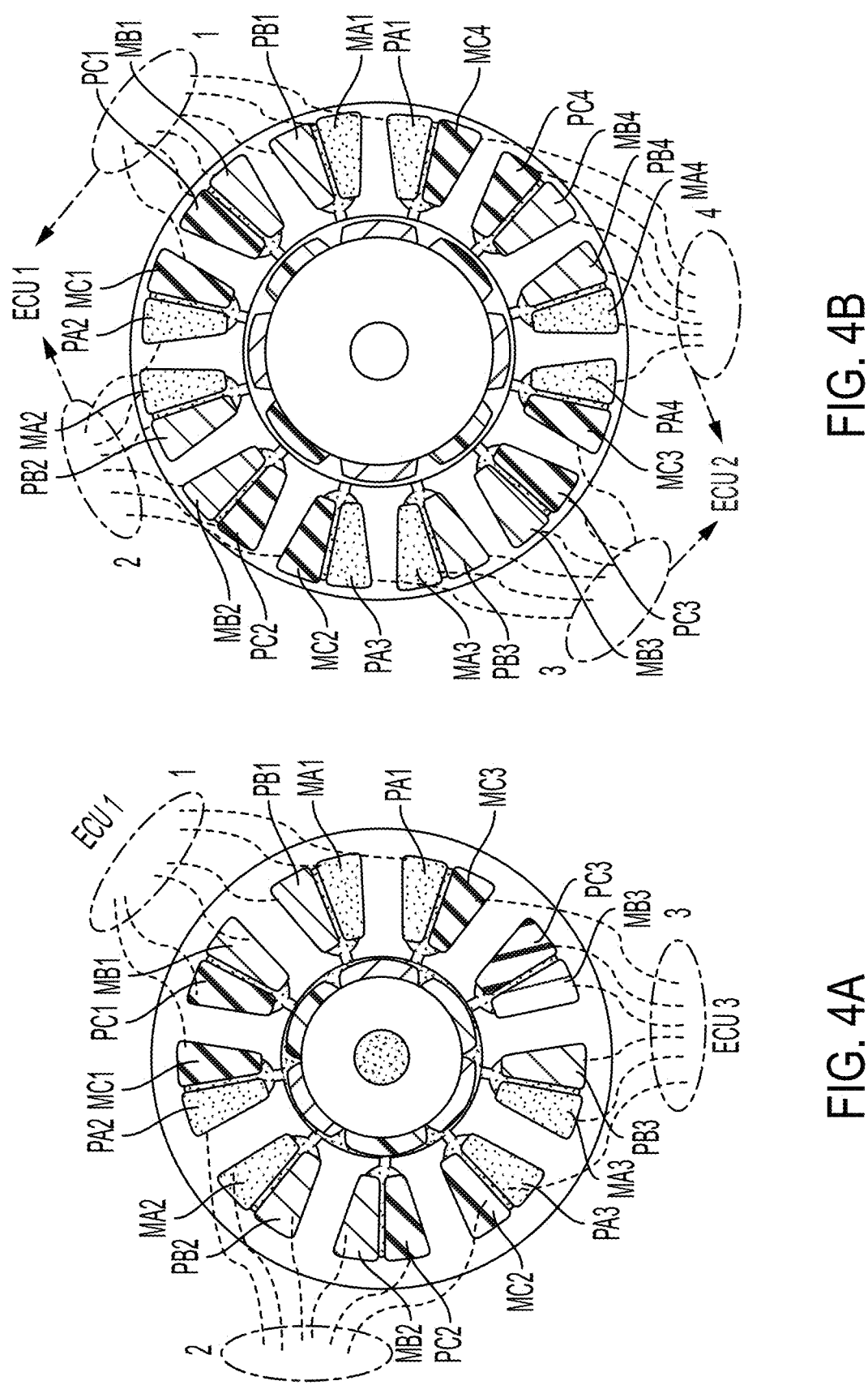
FIGS. 4A-4D generally illustrate various aspects of a motor characteristics according to the principles of the present disclosure.

The four winding sets (1-4) in FIG. 4B for the 12/8 SPMSM may be connected to four, two, or a single ECU based on the level of required fault tolerance. The redundant set of controllers provide a layer of safety for ECU failures. For the SbW system, stringent fault-tolerance requirements may be required. Speed varying damping requirements are typical for egress/ingress and in a fail safe mode of operation. With motor winding design optimization, speed varying passive damping can be provided to meet fault tolerance and egress/ingress requirements while maintaining ECU redundancy. Here, passive damping indicates shorting out one of three winding sets in a 9/6 or one or two winding sets in a 12/8. For example, for a system with dual ECUs, in the event of dual ECU failure, optimized motor shorts can still meet the required damping behavior.

In dq frame of reference, the voltages of a motor winding can be expressed as:

$$v_d = R_s i_d + \frac{d\lambda_d}{dt} - \omega\lambda_q \qquad \text{Equation (1)}$$

$$v_q = R_s i_q + \frac{d\lambda_q}{dt} - \omega\lambda_d$$

In (1), d and q sub-scripts indicate the voltage (v), current (i) and flux linkage (lambda) in the d and q axis respectively. The speed is represented by $\omega$. The flux linkages can be expressed as in (1) where $\lambda_{pm}$ is the permanent magnet flux linkage and $L_d$ and $L_q$ are the inductance in the d and q axis, respectively.

$$\lambda_q = L_q i_q \qquad \text{Equation (2)}$$

$$\lambda_d = \lambda_{pm} + L_d i_d$$

Figures 4C, 4D:
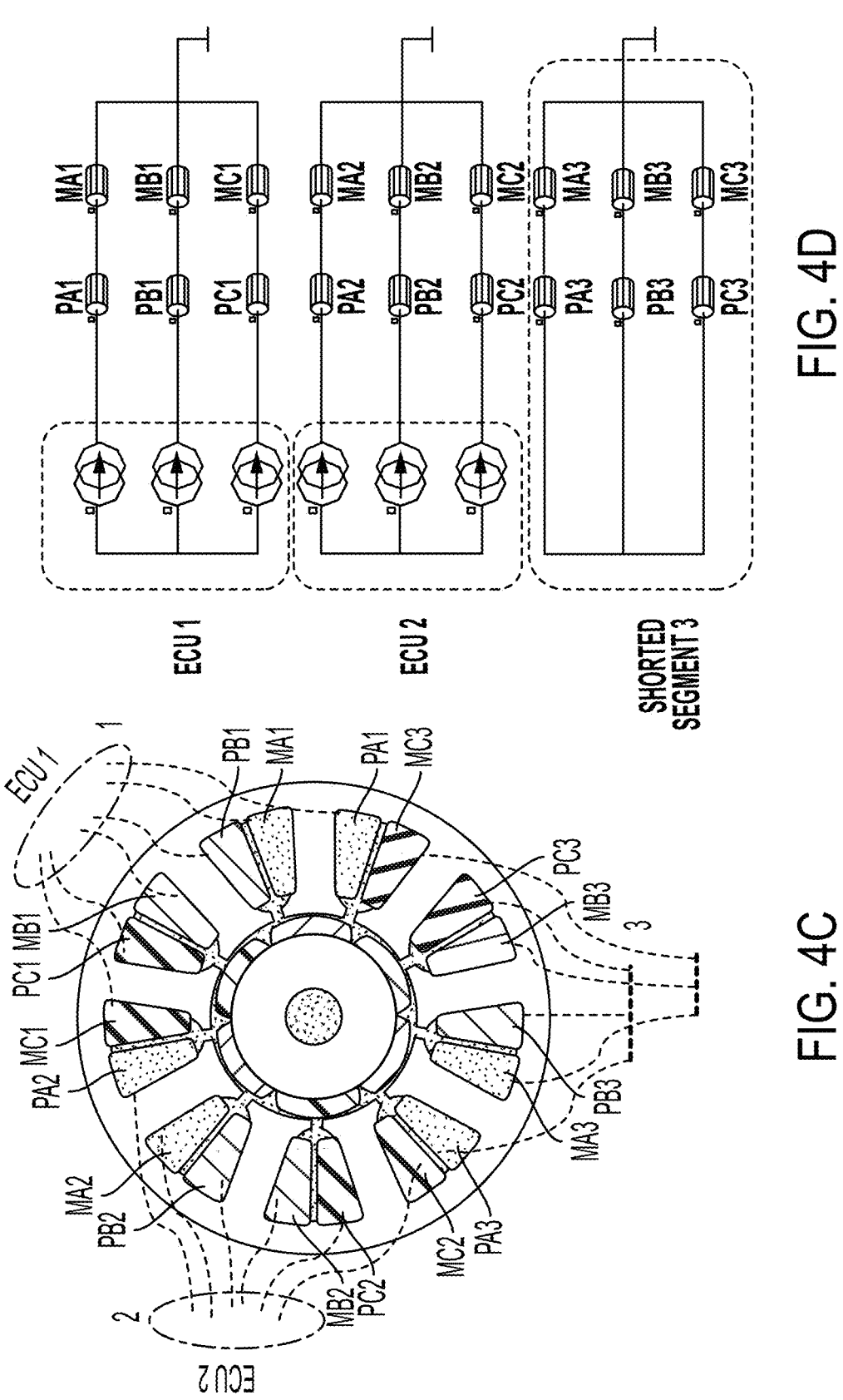

FIG. 4C shows a 9/6 with a dual ECU and a shorted segment of windings (e.g., where thick red lines indicate shorting connections). FIG. 4D generally illustrates a circuit diagram corresponding to FIG. 4C. For a shorted set of winding Vd=Vq=0, and the damping/braking torque ($T_{brk}$) generated can be expressed as in (3), where p is the pole pair number and Rs is the phase resistance.

$$T_{brk} = -\frac{3}{2} p R_s \lambda_{pm}^2 \omega \frac{\left(R_s^2 + \omega^2 L_q^2\right)}{\left(R_s^2 + \omega^2 L_d L_q\right)^2} \qquad \text{Equation (3)}$$

The short circuit current ($I_{shc}$) in the shorted segments can be expressed as in (4):

$$I_{shc} = \frac{\sqrt{\left(\omega^2 L_q \lambda_{pm}\right)^2 + \left(\omega R_s \lambda_{pm}\right)^2}}{R_s^2 + \omega^2 L_d L_q} \qquad \text{Equation (4)}$$

Figure 5B:
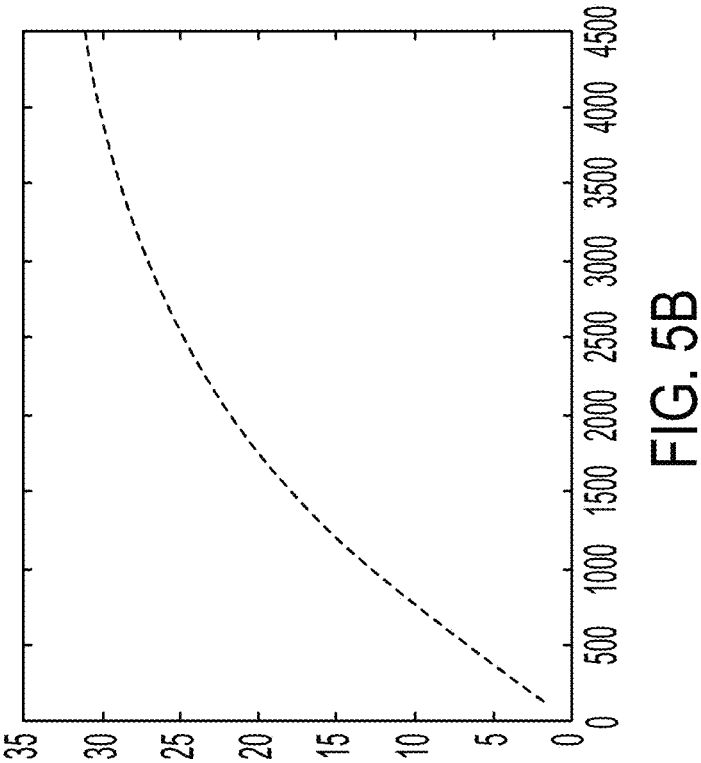
FIGS. 5A-5R generally illustrate various aspects of a motor characteristics according to the principles of the present disclosure.
Figure 5A:
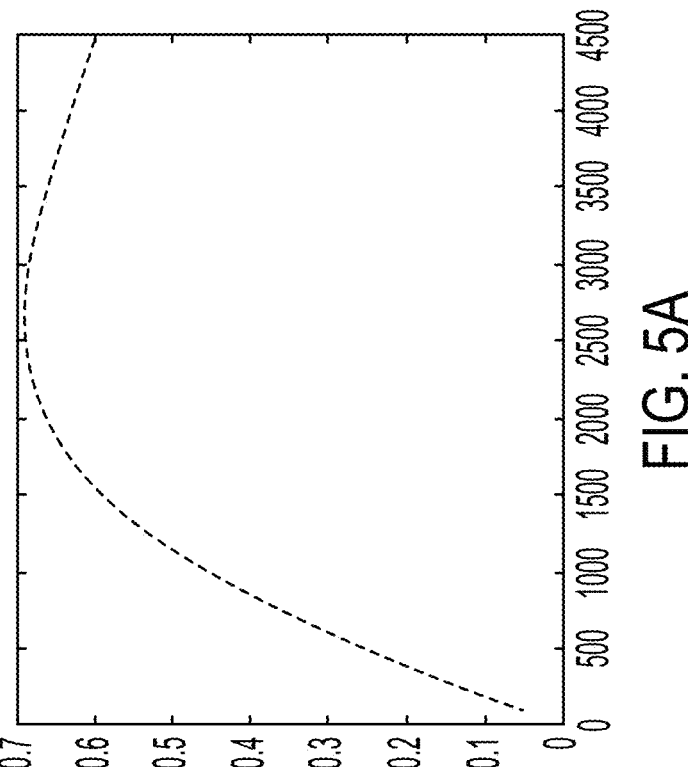

A graphical representation of (3) and (4) over a typical SbW HWA is shown in FIG. 5A (e.g., $T_{brk}$ (Nm) vs. speed (rpm)) and 5B (e.g., $I_{shc}$ (A) vs. speed (rpm)). As illustrated in FIGS. 5A and 5B, the braking torque increases almost linearly with the speed up to a certain range and reaches a peak value. Following the peak, the braking torque starts to drop at higher speeds of operation. The location and magnitude of the peak can be controlled by the resistance and inductance of the winding set. The short circuit current rises linearly up to certain speeds of operation and then the rate of increment slows down and approaches $\lambda_{pm}/L_d$ (e.g., which may be referred to as the characteristic current of the machine/motor).

As suggested by equation (3), the braking torque generated from a PMSM depends on the phase resistance of the shorted segment along with the synchronous inductances. The inductances are directly proportional to the square of the turns number of the shorted segment. For example, each component (PA3, MA3, PB3, MB3, PC3 and MC3) of the shorted segment in FIG. 4D has a resistance of Rshort. Therefore, the phase resistance is 2*Rshort with Nshort number of turns. However, such strategies may not provide a required damping/braking torque, while maintaining normal operation in a SbW HWA system.

Accordingly, systems and methods, such as those described herein, configured to provide improved passive damping behavior of a SbW HWA motor, may be desirable. In some embodiments, the systems and methods described herein may be configured to provide required damping/ braking torque while maintaining normal operation in a SbW HWA system.

The systems and methods described herein may be configured to vary Rshort and Nshort of the shorted segment of a 9/6 and a 12/8 SPMSM to observe the performance of the average torque under normal operating conditions, the braking torque, and the short circuit current. For example, Rshort may not be equal to Rs and Nshort may not be equal N. Rs and N respectively may represent the resistance and number of turns of winding sets connected to the ECUs.

The systems and methods described herein may be configured to evaluate two different slot/pole combinations to observe the impact of Rshort and Nshort. For example, for the 9/6, one third of the machine may be shorted (e.g., winding set 3 and for the 12/8 two variations of half (winding sets 3 and 4 shorted in FIG. 4A) and quarter motor are shorted (e.g., only winding set 4 shorted in FIG. 4B).

The systems and methods described herein may be configured to use depletion/enhanced mode metal-oxide-semi-conductor field-effect transistors (MOSFETs) (e.g., normally on) with motor shorting (e.g., to remove the shorted winding segment during power on operation). Motor shorting may be a simple procedure. However, without proper design opti-mization it may lead to unwanted damping behavior, high short circuit current with thermal consequences, degraded performance under normal operation, interference with nor-mal (e.g., not shorted) winding sets and loss of stability and control of the system. As such, the systems and methods described herein may be configured to provide design con-siderations of shorting a motor winding along with the following unique considerations: the design of shorted wind-ings to regulate damping behavior over speed while main-taining ECU redundancy; reduced or no interference with the rest of system; reduced or no loss of control or stability due to interference between motor winding sets; reuse of existing SbW HWA winding technology and design con-straints.

In some embodiments, the systems and methods described herein may be configured to provide an optimum winding design strategy for passive damping implementa-tion in a SbW HWA motor. Nshort and Rshort of the shorted winding set in an HWA motor may be optimized to produce the desired damping behavior over a typical SbW HWA speed range. For example, the systems and methods described herein may be configured to provide three com-binations of passive damping implementations using two different slot/pole of PMSMs (e.g., 1) one third shorted segment in a 9/6, 2) half motor short in a 12/8, and 3) quarter motor short in a 12/8 PMSM). Additionally, or alternatively, the systems and methods described herein may be config-ured to an provide enhanced active torque generation mode for the SbW HWA motor, which may provide the capability to remove the shorted winding segment during active power generation.

The systems and methods described herein may be con-figured to provide a 9/6 PMSM with the winding arrange-ment, similar to that of FIGS. 4C and 4D (e.g., one third winding shorted). Here, the 9/6 surface mounted PMSM is designed to meet the requirements of a typical SbW HWA motor. For example, the peak torque requirement out of the HWA motor in the second quadrant of motor operation is 2.7 Nm at a motor speed of 500 rpm for a gear reduction ratio of 11 to 1. This specific numbers are subject to change based on the vehicle and the gear reduction ratio implemented in the handwheel side of the SbW system. However, the systems and methods described herein may applied to any SbW HWA system.

Figure 5D:
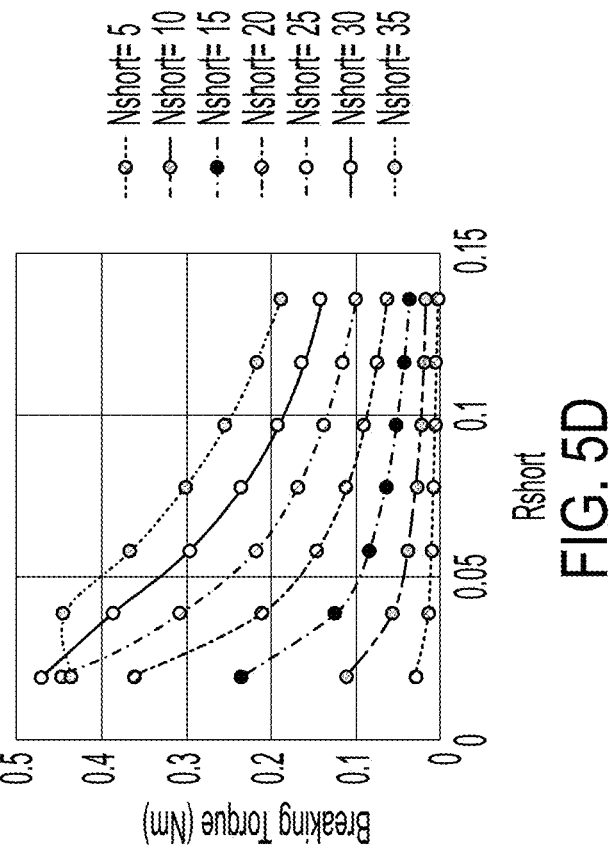
Figure 5C:
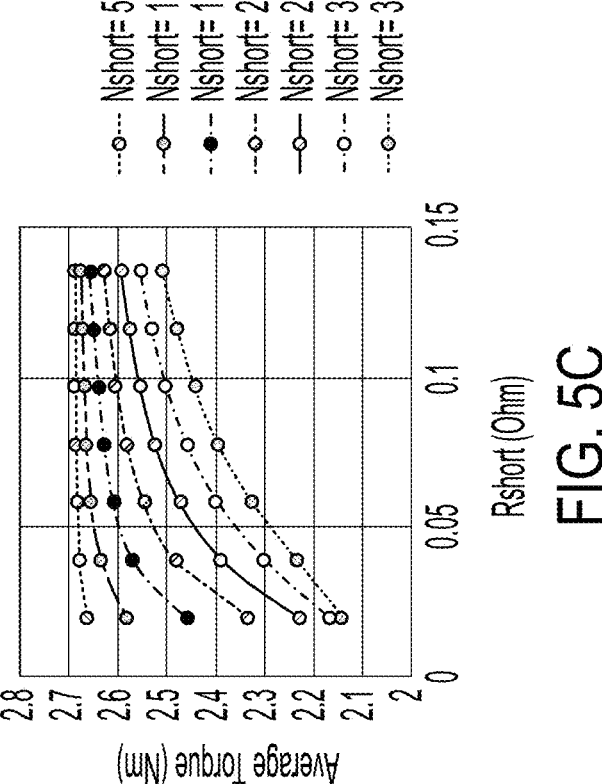

FIGS. 5C and 5d generally illustrate an average and braking torque at a single speed of the 9/6 winding configu-ration presented in FIGS. 4C and 4D (e.g., with varying Nshort and Rshort at a speed of 500 rpm, for example). N and Rs of the winding set 1 and 2 in FIGS. 4C and 4D are kept constant during this analysis. The braking torque decreases with an increment in Rshort if Nshort is kept constant. This in turn increases the average torque of the motor. For a constant Rshort the braking torque increases, and the average torque decreases with increasing Nshort.

Figure 5E:
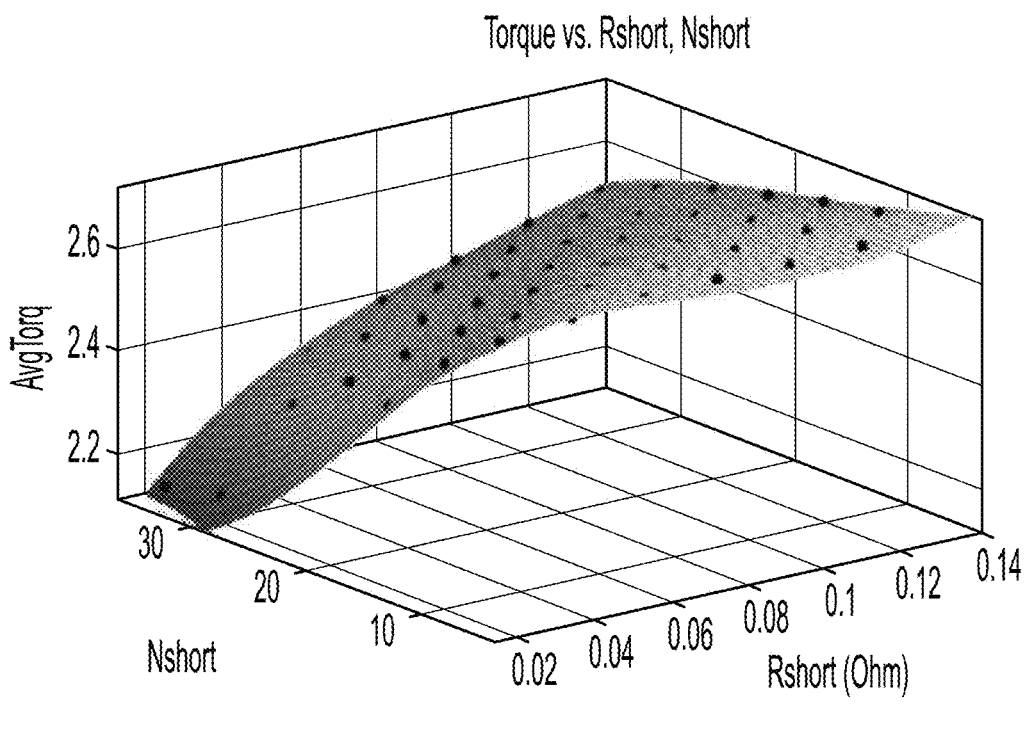
Figure 5F:
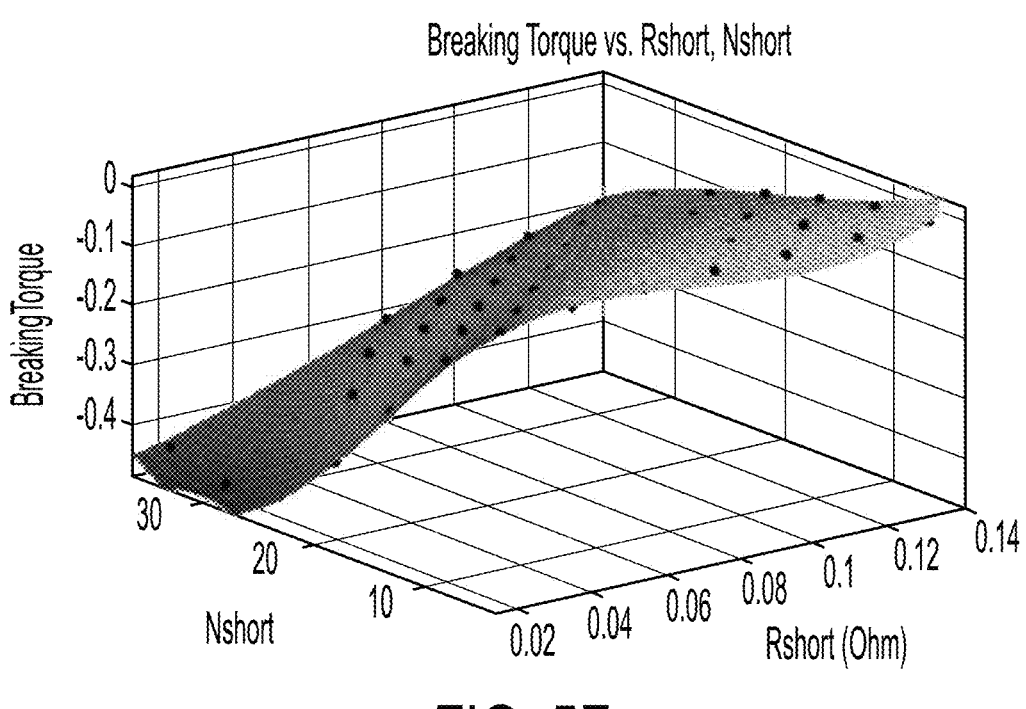

The behavior of the average and braking torque with varying Nshort and Rshort can be put into a closed equation format using polynomial based regression analysis as shown in FIGS. 5E and 5F (e.g., showing a polynomial based average torque and braking torque estimation (braking torque is considered to be negative for the regression analy-sis since it opposes the average torque generation). Higher order polynomials (e.g., >2) can be used for the process. However, the coefficients attached to the higher order (e.g., >2) terms were found to be very low in the example case.

The empirical estimates of the average torque (Tavg) and braking torque ($T_{brk}$) is expressed in (5) using an order 2 polynomial. Using (5), the amount of Nshort and Rshort used to achieve any amount of Tavg and $T_{brk}$, can be calculated.

$$T_{avg} = 2.649 + 0.012N_{short} - \qquad \text{Equation (6)}$$
$$4.099R_{short} + 0.109N_{short}R_{short} - 6.223R_{short}^2$$
$$T_{brk} = -0.039 + 0.011N_{short} - 3.982R_{short} + 0.088N_{short}R_{short} - 3.449R_{short}^2$$

Figures 5G, 5H:
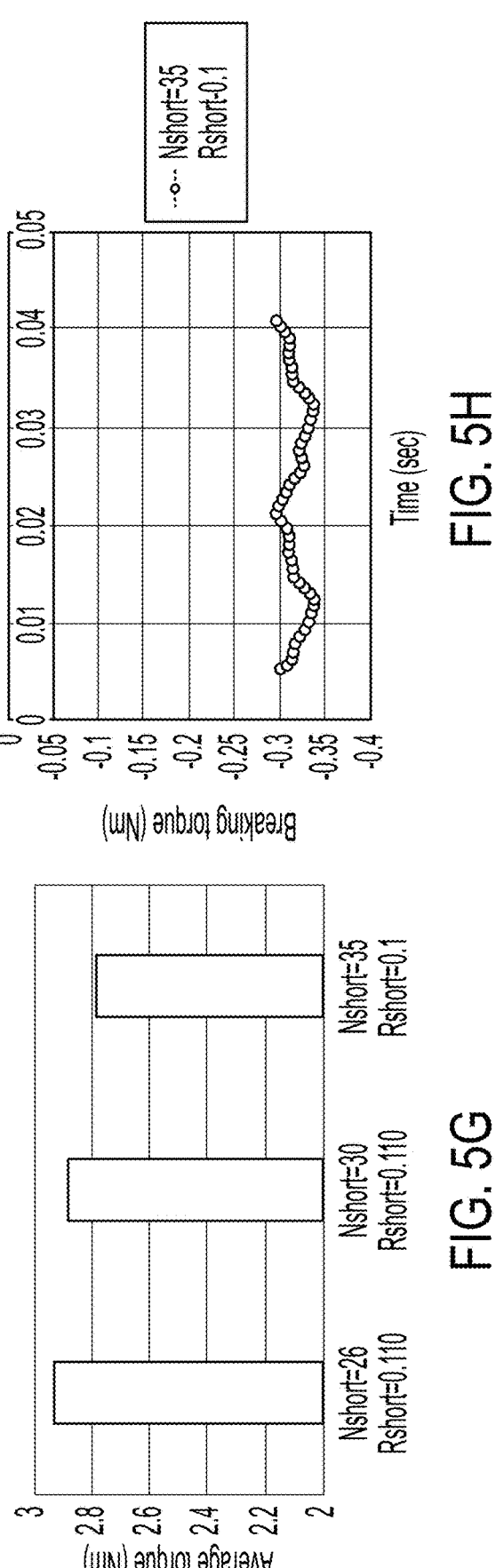

Based on (5) and the example case studied, to achieve a 2.7 Nm average torque with a −0.3 Nm braking torque at 500 rpm motor speed, an Nshort=26 and Rshort=0.110 ohm is used. Finite element analysis (FEA) based validation of this solution is presented herein. The empirical model in (5), slightly underestimates the torque value. A Nshort=35 with a Rshort-0.1 Ohm, closely meets the average torque require-ment. Moreover, as seen from the time domain torque representation in FIGS. 5G and 5H (e.g., FEA based vali-dation of parametric study at 500 rpm), the braking torque requirement of −0.3 Nm at 500 rpm is also met with Nshort=35 and Rshort=0.1 Ohm combination.

Figure 5I:
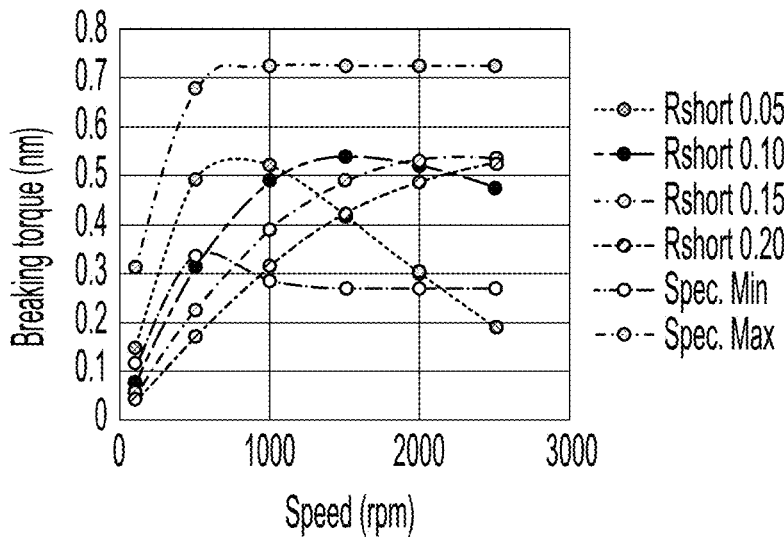
Figure 5J:
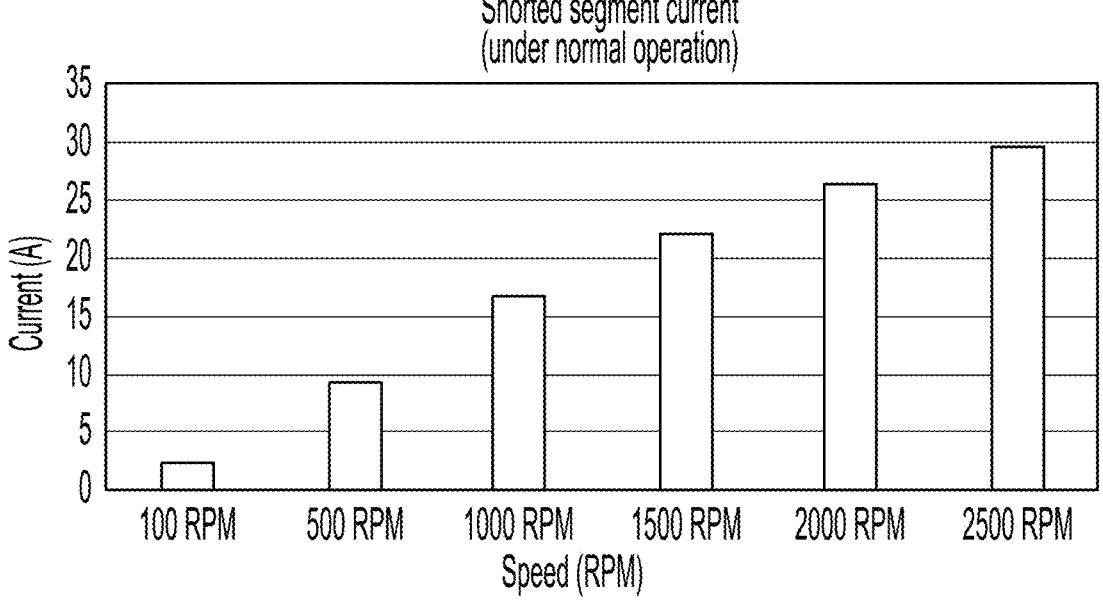

In some embodiment, the systems and methods described herein may be configured to provide braking torque and short circuit current over a speed range. For example, the systems and methods described herein may be configured to provide the braking torque and short circuit current, pro-duced in the shorted winding set of a 9/6 PMSM, over a typical SbW HWA motor speed range. As described, an Nshort=35 with an Rshort=0.1 Ohm, satisfies the average torque and braking torque requirement of the specific example. FIG. 5I presents the variation of braking torque with speed with different values of Rshort while the Nshort is kept constant (Nshort=35). Moreover, FIG. 5I shows two sets of specification (spec.) curves with a maximum and minimum value of acceptable damping/braking torque for this particular SbW HWA motor. Breaking torque curves presented in FIG. 5I follows the trend shown in FIG. 5A which is based on equation (3). With increasing Rshort the rate of increase in damping with speed slows down when Nshort is kept constant. Moreover, a higher value of Rshort is associated with a higher value of speed at which the maximum value of braking torque occurs. Following the maximum braking torque location, the braking torque starts decreasing with higher speeds of operation. As illustrated in FIG. 5I, a Rshort=0.1 Ohm with a Nshort=35, satisfies the braking torque requirement over the speed range of interest. The results in FIG. 5I are based on FEA which does not consider friction torque. Therefore, the experimental values of the braking torque might be slightly higher. The shorted segment current in FIG. 5J follows the trend in FIG. 5B, which is based on equation (4). The resistance of the shorted winding segment with a fixed number of turns can be changed by three approaches, 1) wire diameter, 2) number of strands in hand, and 3) external resistive component. Careful selection or combination of these three strategies is required to maintain a safe current density at higher speeds of operation for a SbW HWA motor with the proposed passive damping.

Figures 5K, 5L:
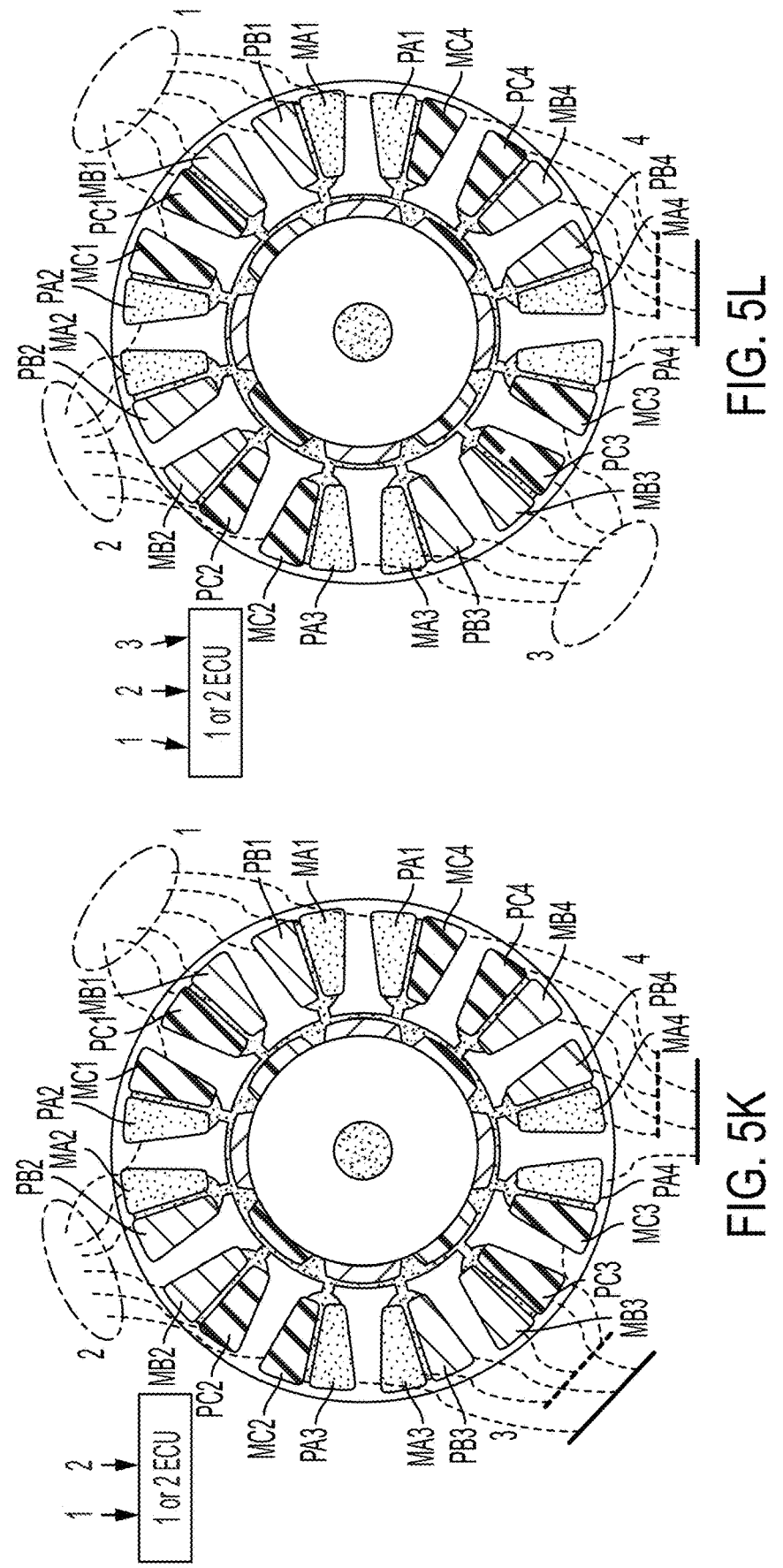
Figure 5M:
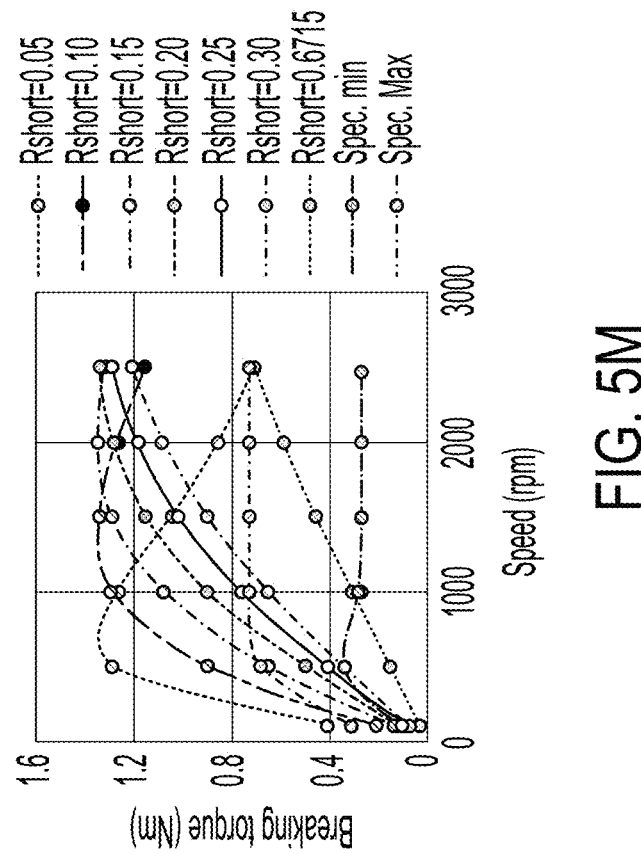
Figure 5N:
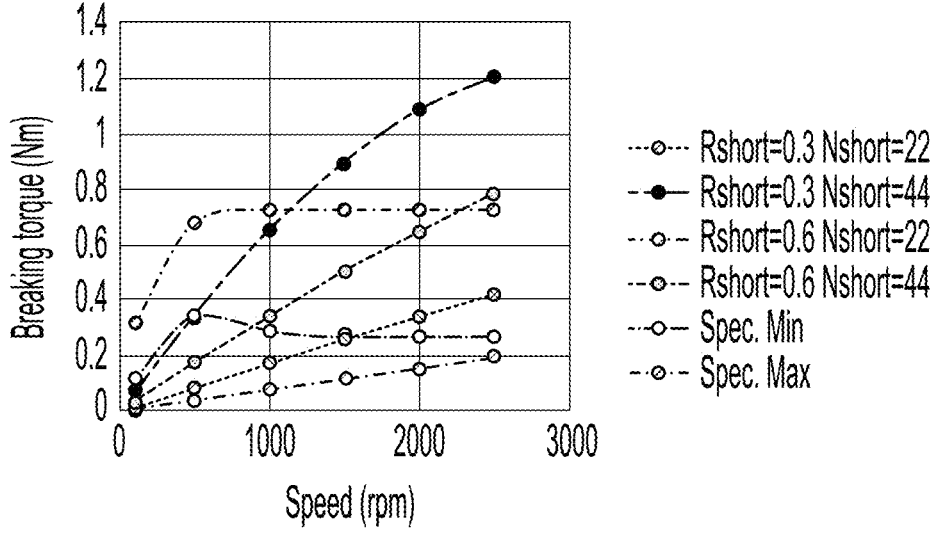
Figure 5O:
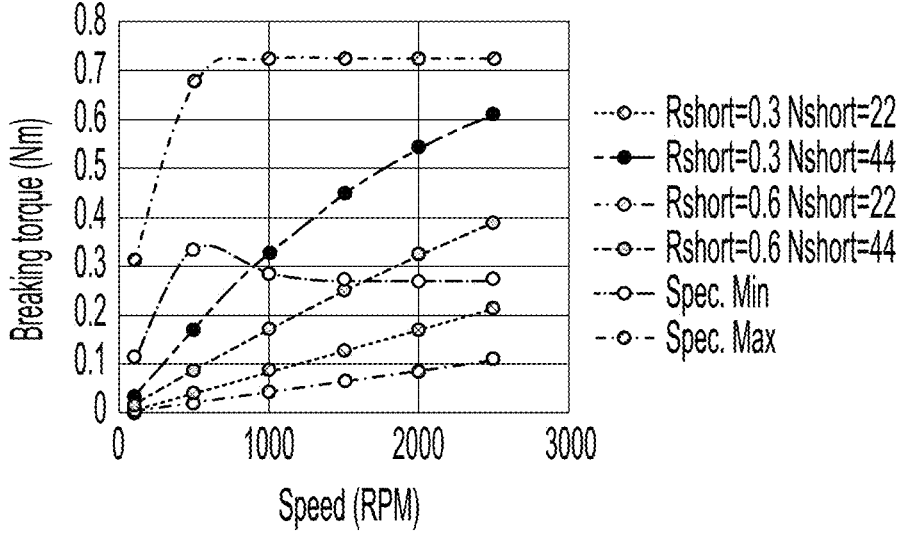

In some embodiment, the systems and methods described herein may be configured to provide a 12/8 PMSM that uses two different combinations of winding arrangements, as is generally illustrated in FIGS. 5K and 5L (e.g., which illustrates a half (FIG. 5K) and a quarter motor short (FIG. 5L) with a single or multiple ECUs). The 12/8 machine without the motor shorts may be designed to follow the same set of specifications used in the 9/6 HWA motor. For the 12/8 motor, N=44. For example, Nshort is kept at 44, while Rshort is varied. In this case, phase resistance=4*Rshort as per the definition described herein. As is generally illustrated in FIG. 5M, for a half motor shorted 12/8, with a fixed number of turns, a very high resistance is required for Rshort to bring the braking torque within the specified limits. Implementation of a very high resistance indicates lower wire diameter or lower number of strands in hand which might drive the current density up. However, external resistive components can be used for such a case. Four different combinations of Nshort and Rshort are generally illustrated in FIGS. 5N and 5O, for a half motor short and quarter motor shorted case of 12/8. For the quarter motor shorted case, phase resistance of the shorted segment is equal to 2*Rshort, and the other three winding sets are connected in series to a single ECU. Multiple ECUs can also be connected for the quarter 12/8 short case. Based on FIGS. 5N and 5O, a Rshort=0.6 and Nshort=44 closely meets the specifications for the half motor short case and a Rshort=0.3 and Nshort=44 meets the requirement for the quarter motor short case. The quarter motor shorted case roughly provides half of the braking torque of the half motor shorted 12/8 HWA.

Figure 5P:
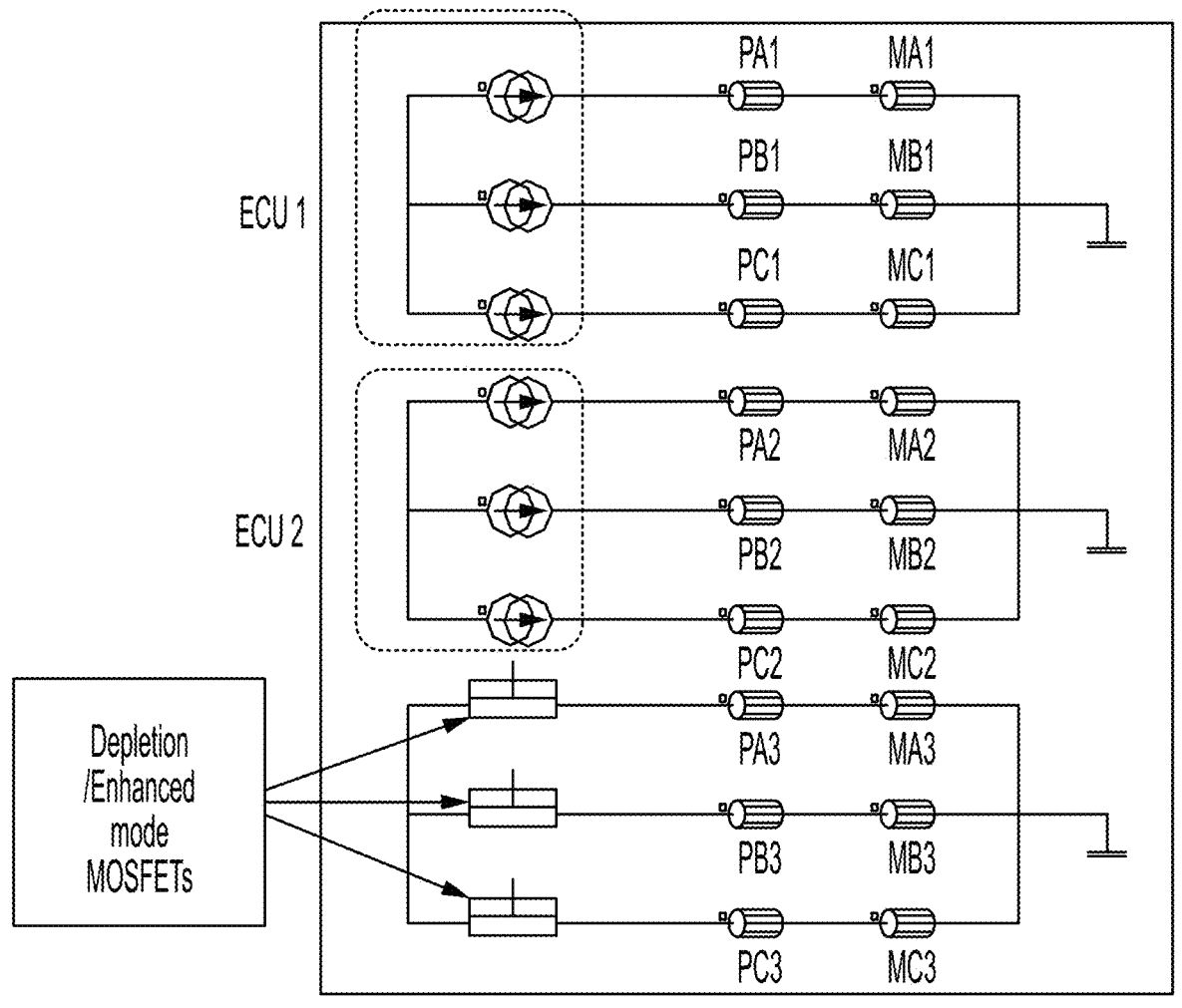

In some embodiment, the systems and methods described herein may be configured to provide enhanced active torque generation. The systems and methods described herein may be configured to provide enhanced active torque generation for a SbW HWA motor with passive damping. As is generally illustrated in FIG. 5P, for the 9/6 HWA motor, the third winding set can be shorted with depletion/enhanced mode MOSFETs, which are normally ON. These MOSFETs provide the ability to remove the winding shorts under power ON conditions. As a result, during active torque generation the HWA motor will not have to overcome the braking torque generated from the shorted segment. Motor stack length increment might be needed for a SbW HWA motor with an ever-present shorted winding segment to achieve the required average torque under normal operating conditions. However, the shorted segments may be removed during active torque generation. Therefore, motor dimensional changes would not need to be as drastic. While FIG. 5P shows the implementation of the depletion/enhanced mode MOSFETs for a 9/6 HWA, the systems and methods described herein is may be applied to any HWA with any slot/pole combination.

As described, the resistance Rshort can be varied by the number of strands in hand. The depletion/enhanced mode MOSFETs suggested in this section can be placed in series with each strand. This may provide the added capability of varying the resistance Rshort, to tune the braking torque, during operation of the HWA motor. For example, at lower speeds, low Rshort value may be required to provide more damping. For the low Rshort implementation, higher number of strands can be used while at higher speeds of operation high Rshort can be implemented by removing strands using depletion/enhanced mode MOSFETs.

Figure 5Q:
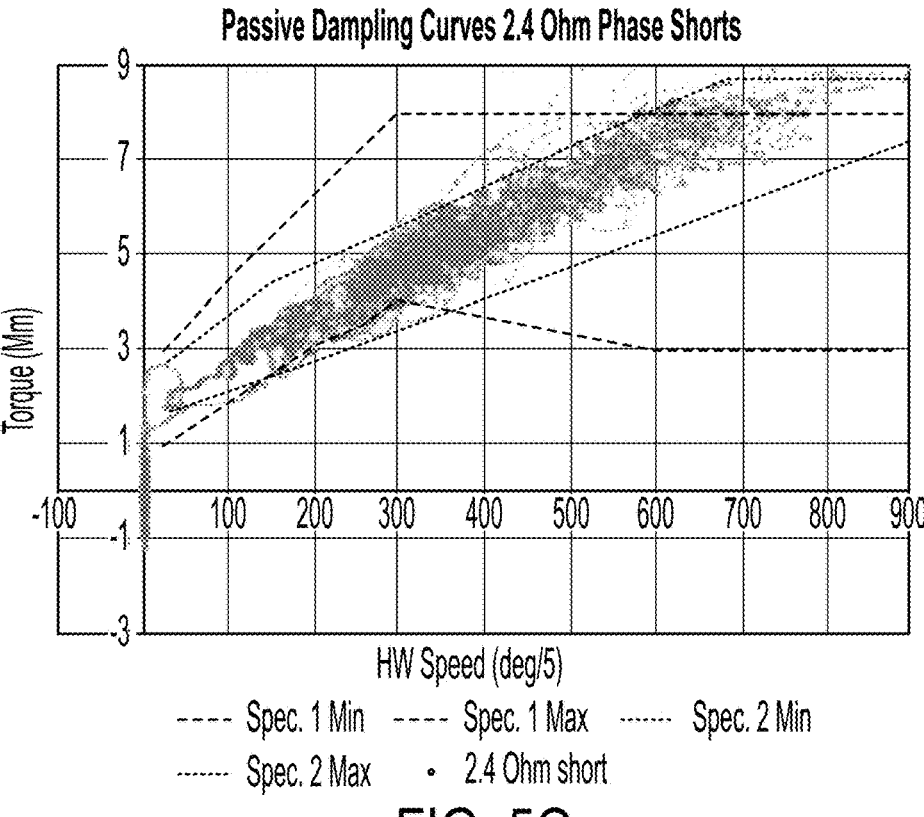
Figure 5R:
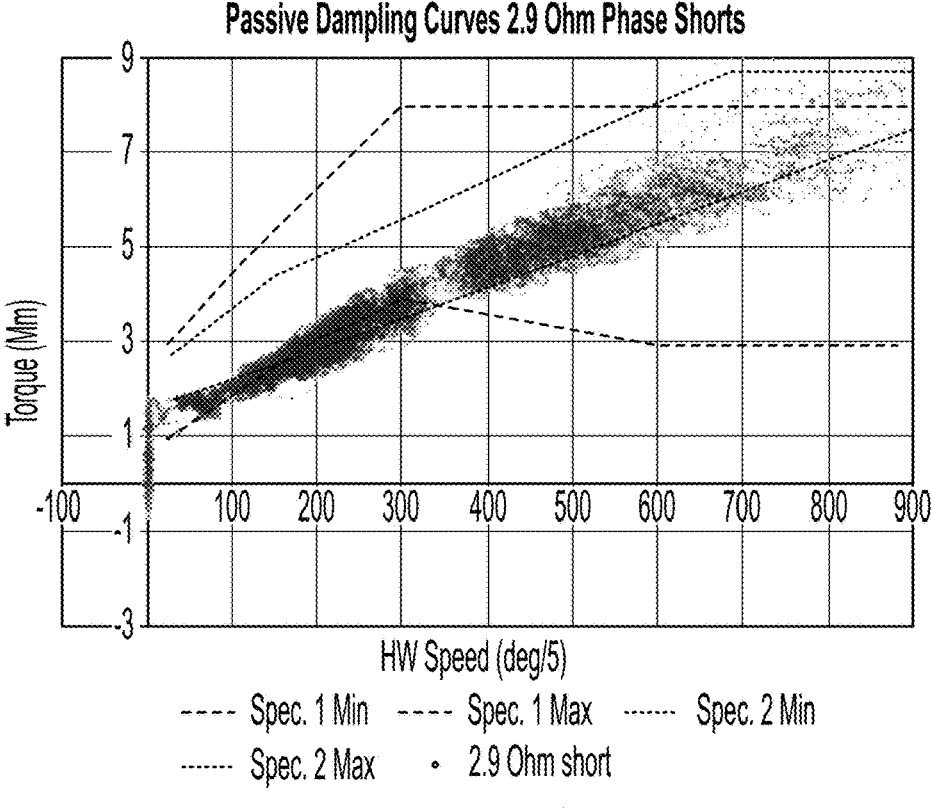

In some embodiment, the systems and methods described herein may be configured to provide engineering validation. The systems and methods described herein may be configured to use a test stand. The system on the handwheel side, as shown in FIG. 3, may be implemented in the test stand. A 12/8 HWA motor with half motor short may be used for the proof-of-concept. External power resistors are used to modify Rshort while keeping the Nshort=44 constant in the test setup. As seen from FIG. 5N, an Nshort=44 and Rshort=0.6 produces a damping curve roughly within the specified limits over the speed range of interest. As described, for the half motor shorted 12/8 HWA, the phase resistance is 4*Rshort. Therefore, a phase resistance close to 4*0.6=2.4 Ohms would be required (e.g., if Nshort=44) to produce the desired damping behavior. FIGS. 5Q and 5R (e.g., braking torque test results with external resistive components (two possible set of specifications are shown) X axis shows handwheel speed, motor speed=11*HW speed, to obtain motor torque, y axis data may be divided by 11) generally illustrate the damping behavior with two different values of external resistance (e.g., 2.4 and 2.9 Ohm) added. Going from FIG. 5Q to FIG. 5R, the slope of the braking torque increment vs. speed slightly reduces. The same behavior is seen in FIG. 5N with increasing resistance while the number of turns is kept constant. The test results closely follow the simulation-based predictions and prove the validity of the systems and methods described herein.

In some embodiments, the systems and methods described herein may be configured to optimize damping/braking torque in a SbW HWA motor by systematic winding shorting, while maintaining ECU redundancy. In some embodiments, the systems and methods described herein may be configured to optimize the number of turns and the resistance of the shorted winding set/or sets, to shape the damping behavior over speed.

In some embodiments, the systems and methods described herein may be configured to vary the resistance of the winding set by changing the wire diameter, number of strands in hand, and by using external resistive components (e.g., where the number of turns and resistance of the shorted segment is different from those of the winding sets connected to the ECU(s)). In some embodiments, the systems and methods described herein may be configured to not interfere with the rest of SbW system. In some embodiments, the systems and methods described herein may be configured to avoid loss of control or stability due to interference between motor winding sets. In some embodiments, the systems and methods described herein may be configured to provide an enhanced mode of passive damping generation, by placing depletion/enhanced mode MOSFETs in series with the shorted winding set, to prevent the need of motor size enlargement. Additionally, or alternatively, the depletion/enhanced mode MOSFETs can provide the added capability of varying shorted winding resistance with speed, to tune the damping, if placed in series with each strand of wire of the shorted winding set.

In some embodiments, the systems and methods described herein may be configured to select a number of windings for a motor of a handwheel actuator. The motor may include a 9/6 motor, a 12/8 motor, or other suitable motor. The motor may include a PMSM, such as an SPMSM or other suitable motor. The systems and methods described herein may be configured to short a subset of windings of the number of windings. The systems and methods described herein may be configured to determine a resistance value for the motor. The systems and methods described herein may be configured to selectively adjust the resistance value based on a number of windings associated with the subset of windings. The systems and methods described herein may be configured to provide, in series with the subset of windings, at least one MOSFET configured to vary the resistance associated with the subset of windings based on a vehicle speed, and tune a damping characteristic associated with the handwheel actuator. The at least one MOSFET may include a depletion/enhanced mode MOSFET.

In some embodiments, the systems and methods described herein may be configured to use a needle wound (e.g., or other suitable machine) comprising a space between the windings. The systems and methods described herein may be configured to use the space to construct an auxiliary winding for achieving the desired passive damping function. For example, in the case of a needle wound machine, a void is left between the windings, in order to have space for the needle. After winding, this space may be used for the auxiliary winding. For example, two or more round or rectangular bars may be placed in at least one of the voids. These bars may then be shorted in the region outside the end turns of the motor.

In some embodiments, the bars may be constructed in pairs (e.g., like "hair pins"). The bars could may then be placed in pairs of the voids and shorted at the opposite end by any suitable means. For example, the pairs bars may be shorted individually by closing an open end of a respective pair of bars to form a continuous loop (e.g., electrically). The closure may be formed by welding, soldering, and/or the like. Additionally, or alternatively, the pairs of bars may be shorted using a bus bar structure to short all of the free ends of the conductors using one or more conductors. Bus bars may be used at each end of the machine to provide individual conductors in each slot.

Once the auxiliary winding is constructed, the systems and methods described herein may be configured to insulate the auxiliary winding and support the auxiliary winding. For example, the individual conductors or "hair pins" may be insulated with a coating similar to a coating used in magnet wire. Additionally, or alternatively, the bus bar structures may be coated using a plastic or foam material integrated to provide support and insulation. Additionally, or alternatively, the auxiliary winding may be insulated and/or supported using a potting technique.

In some embodiments, in a machine where each coil is wound around 1 tooth, the systems and methods described herein may be configured to wind 2 coils around each tooth. For example, a first coil (e.g., the larger coil) may be the conventional motor winding, while the second coil (e.g., the smaller coil), may be the damping winding. The first motor winding coils may be connected in any combination of series and parallel paths. The second winding coils may be connected in any combination of series and parallel paths. The first winding and the second winding may have the same or different number of series and parallel paths. The number of turns and wire gauge of the first coils and second coils may be the same or different. The second winding may be shorted internally to the motor or externally. Such shorting may be direct, which may be relatively simple, or through a power resistor network, which may allow for additional flexibility (e.g., allowing for tuning and for moving at least some of the heat generated from the damping process away from the windings to improve durability and stability with temperature).

Typically, auxiliary windings in shaded pole motors have a corresponding location in the stator and are used to create a moving magnetic field to start the motor. By contrast, the systems and methods described herein may be configured to provide auxiliary windings that are integrated into an unmodified tooth structure and used to create a smooth braking torque.

As is generally illustrated in FIGS. 7A-7E, the systems and methods described herein may be configured to provide passive damping using hair pin windings. For example, the hair pin windings may be placed in between needle wound windings of adjacent teeth. Y and Delta connected patterns of shorting are evaluated. For the Y connection, a 1.5 mm×13 mm hair pin with a single turn may be used. For the Delta connection, a 1.8 mm diameter wires with 4 wires in hand and a single turn may used.

Figure 7A:
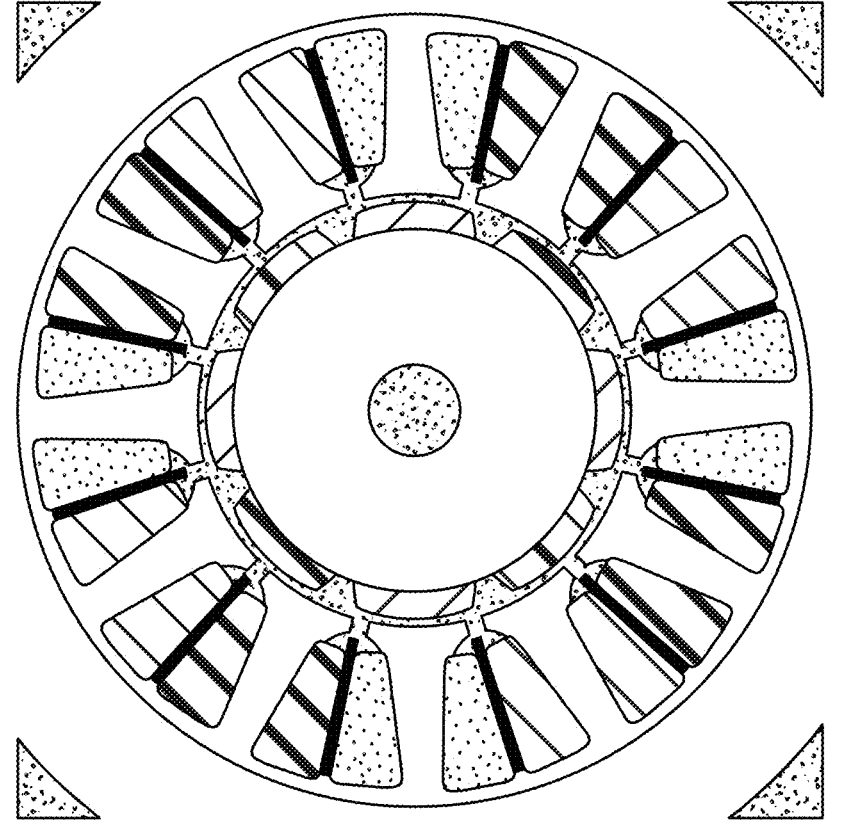
FIGS. 7A-7Z generally illustrate various aspects of a motor characteristics according to the principles of the present disclosure.
Figure 7B:
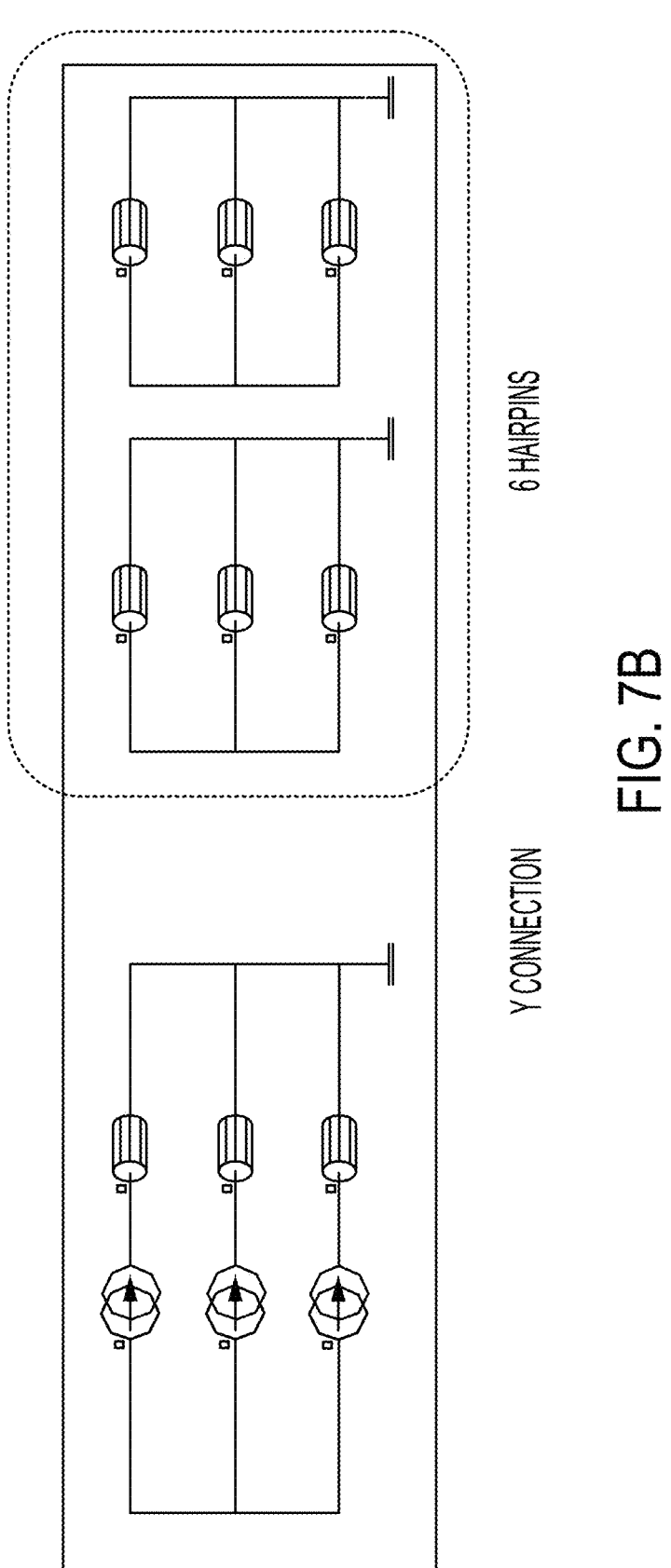
Figure 7C:
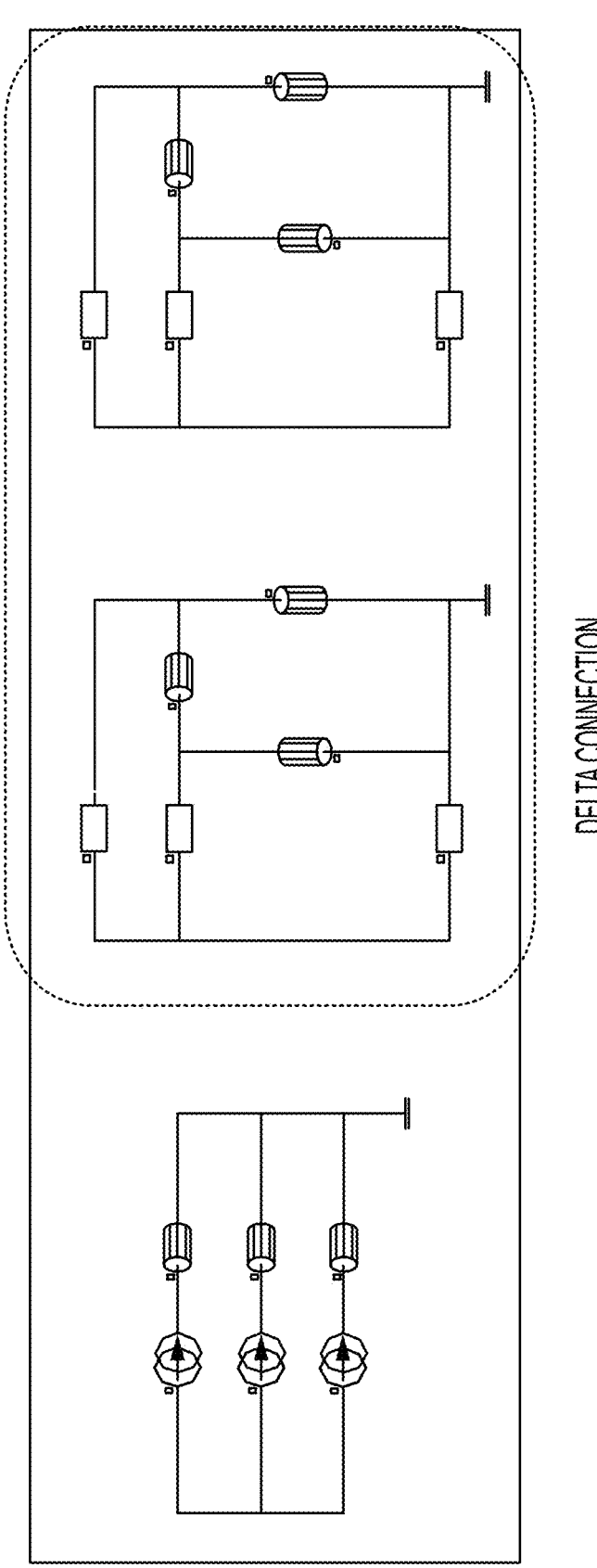
Figures 7D, 7E:
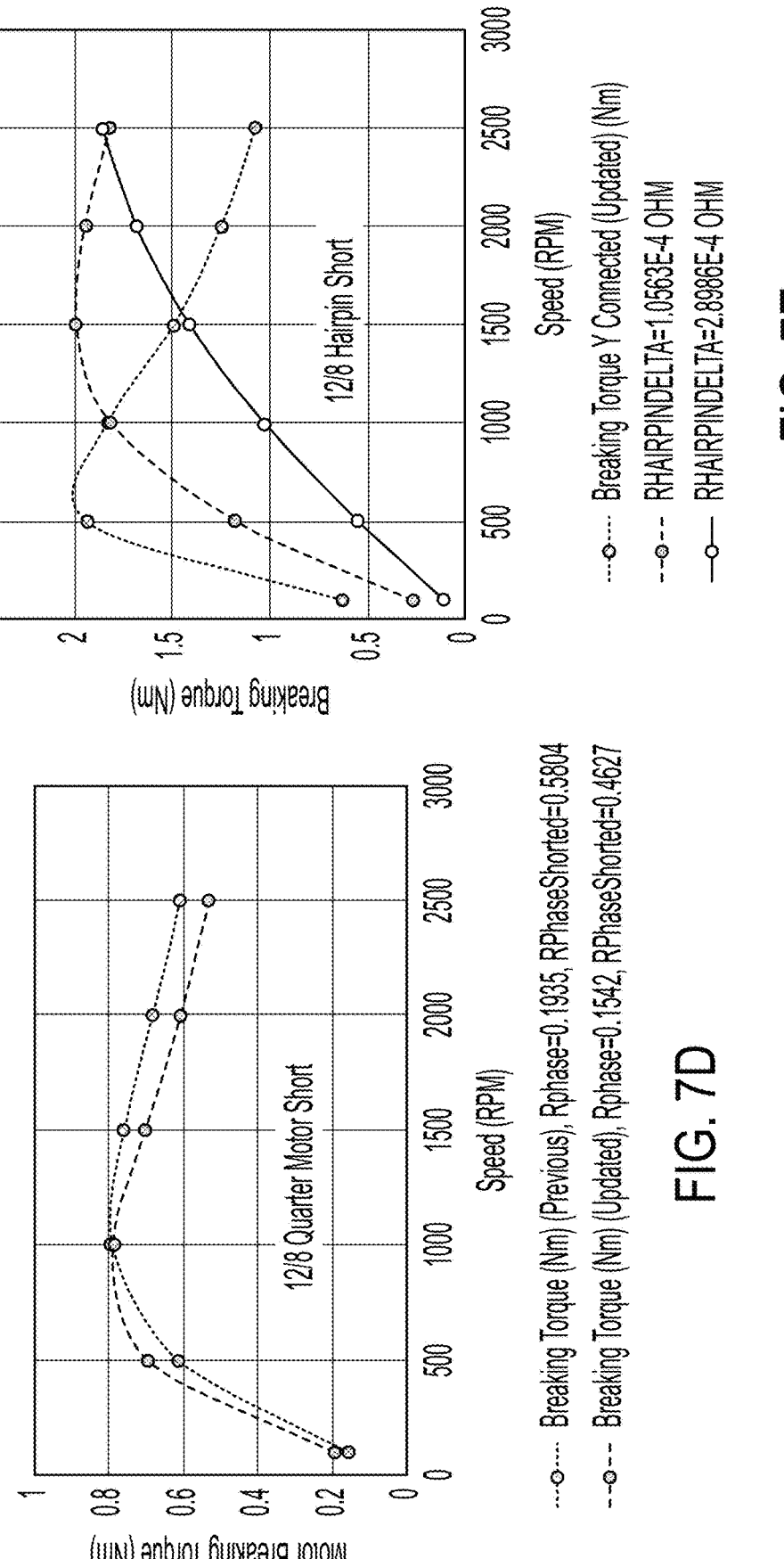
Figures 7F, 7G, 7H:
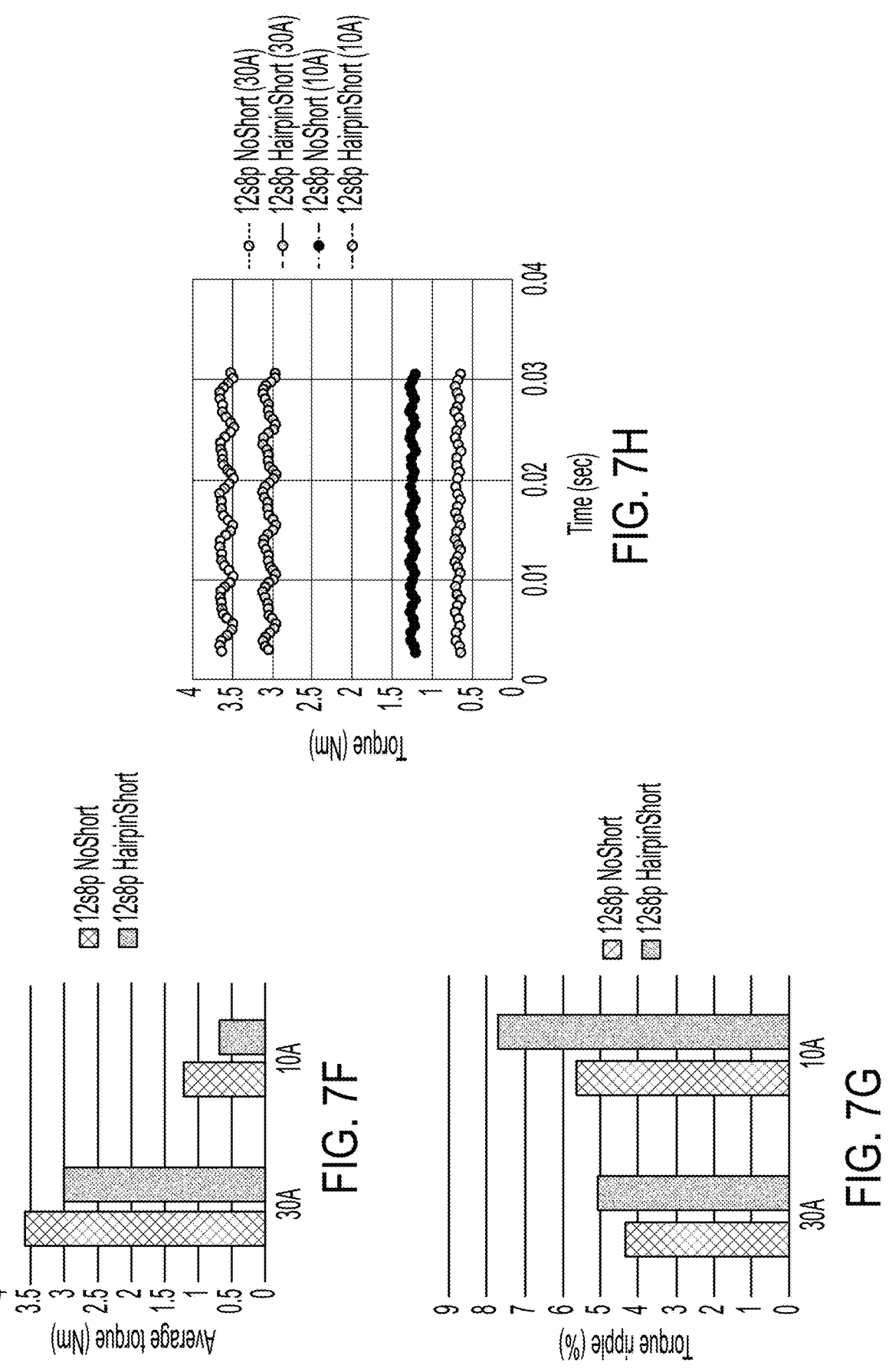

As is generally illustrated in FIGS. 7F-7H, torque ripple analysis in the first quadrant (e.g., for the delta connection with Rphase=2.8986e-4 Ohm) results in an average torque reduction due to passive damping. For example, torque ripple percentage increases by comparatively smaller margins.

Figure 7I:
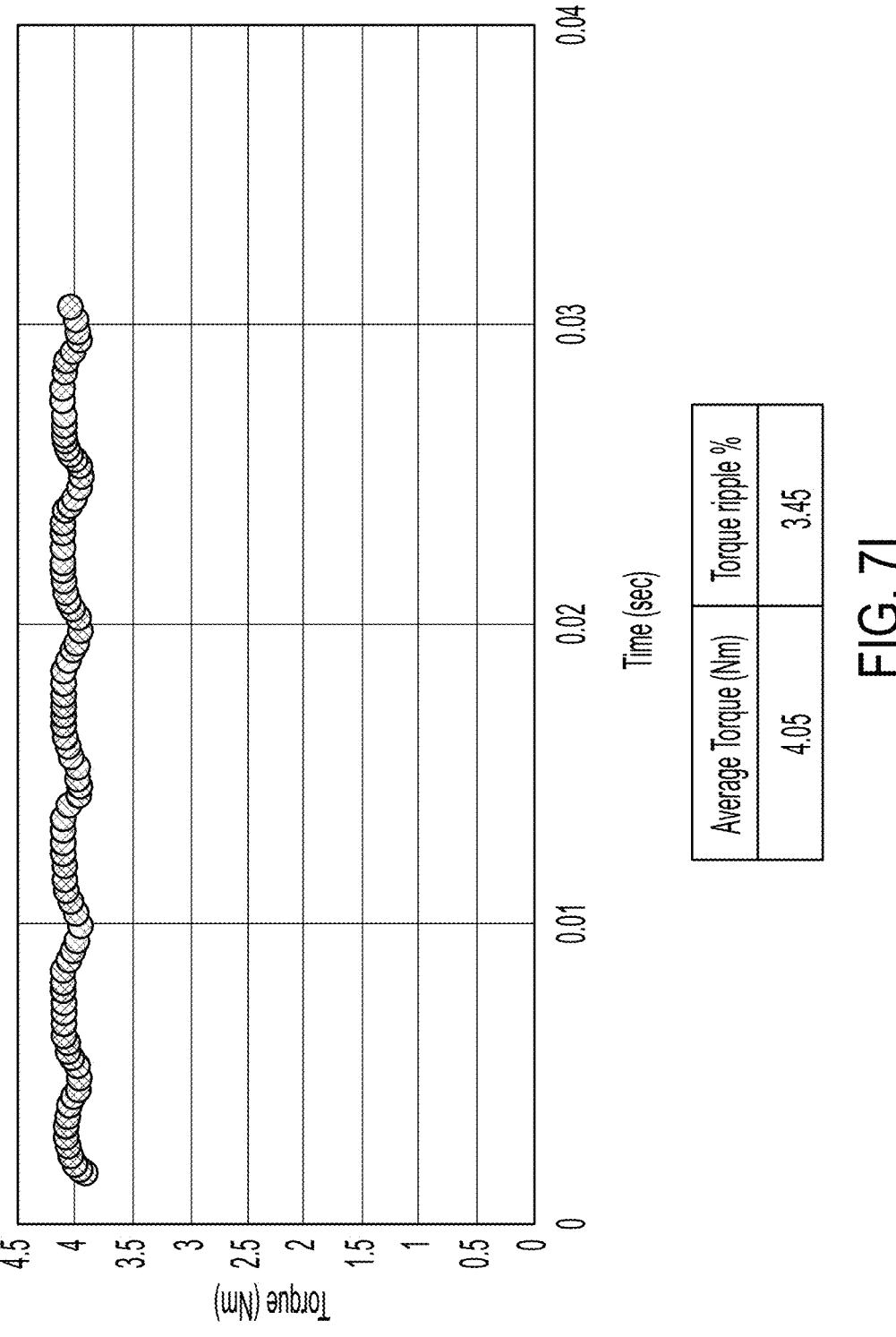

FIG. 7I generally illustrates a second quadrant simulation performed with CW rotation in FEA at 500 rpm (e.g., for the delta connection with Rphase=2.8986e-4 Ohm). Phase current sequence is kept the same as the first quadrant. Braking torque and torque generated by the machine adds up. Analysis here is performed with 30 A phase current. Torque ripple percentage in the second quadrant with hair pin short is lower compared to ¼ motor shorted case.

Figure 7K:
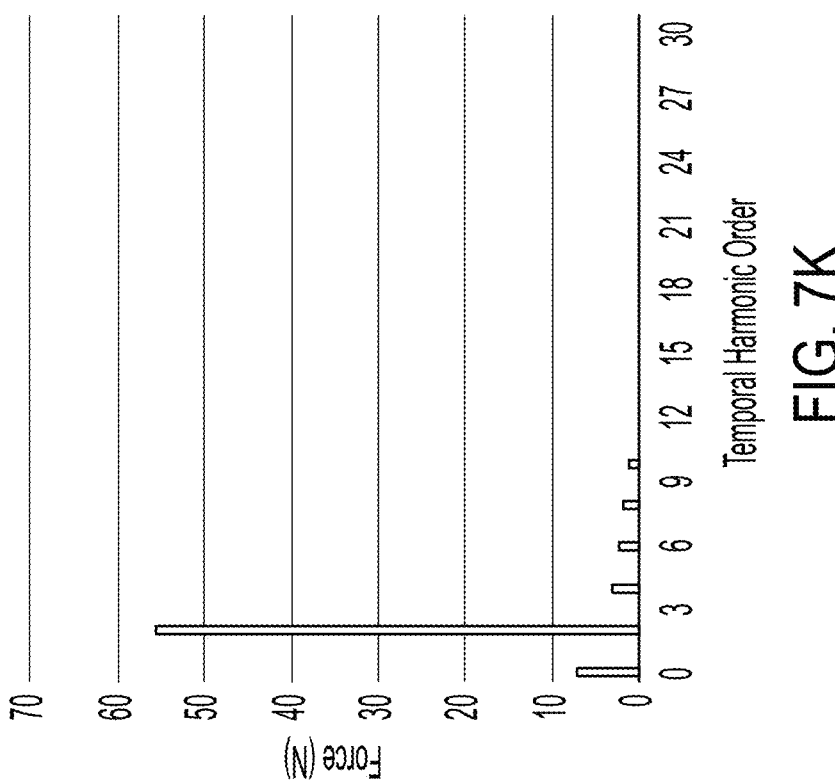
Figure 7J:
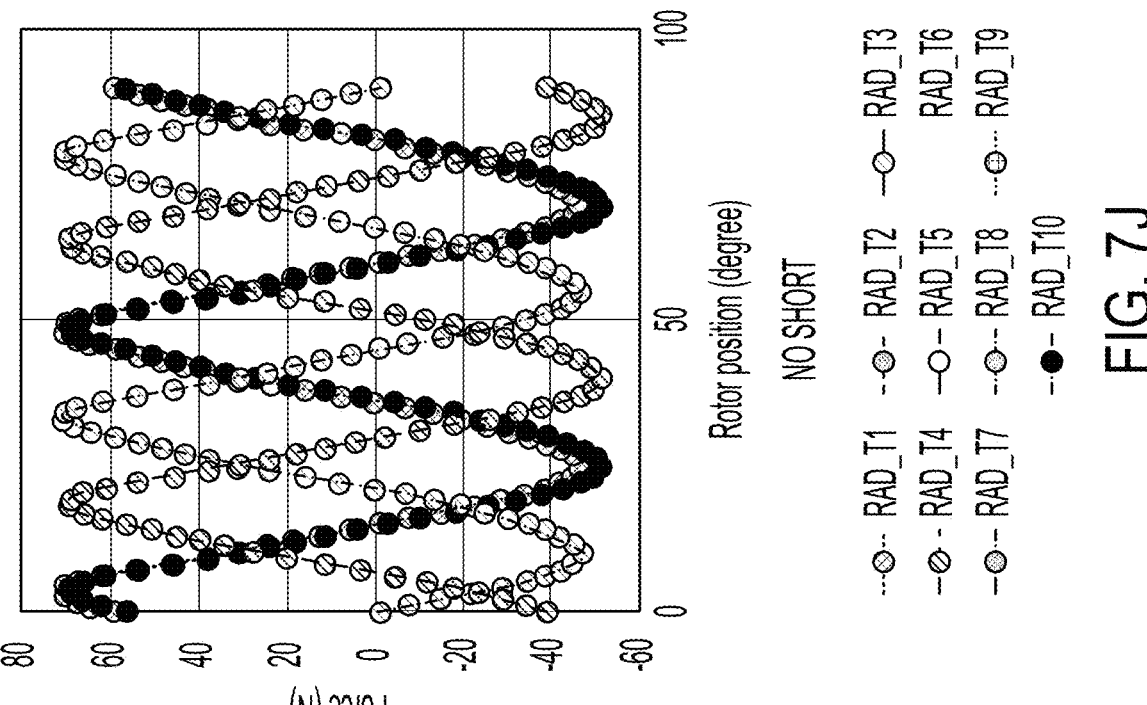
Figure 7L:
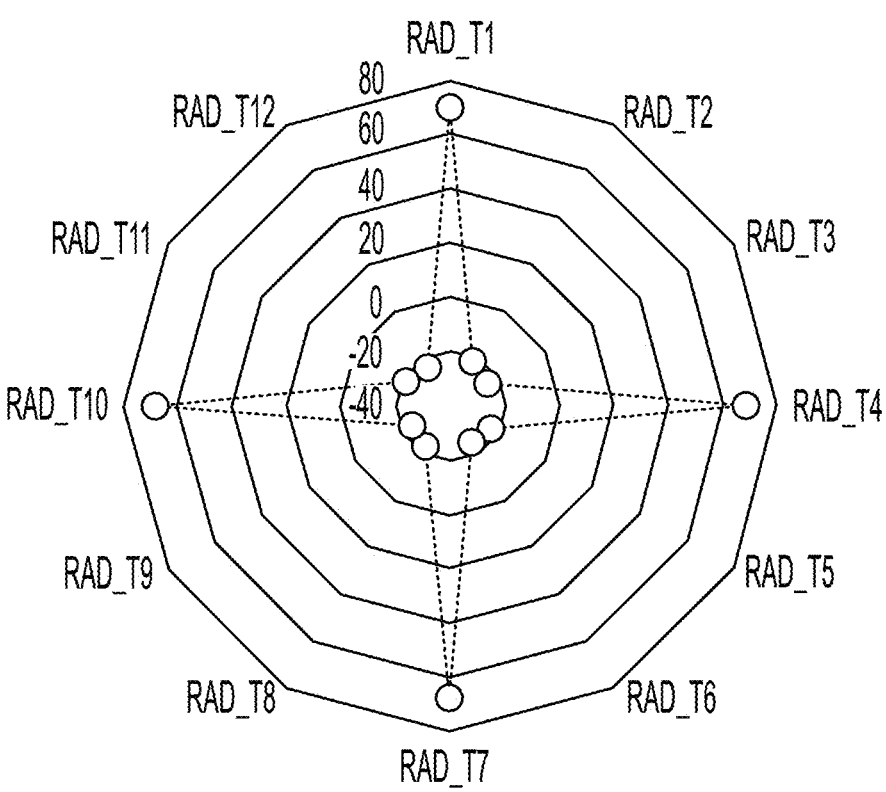
Figures 7M, 7N:
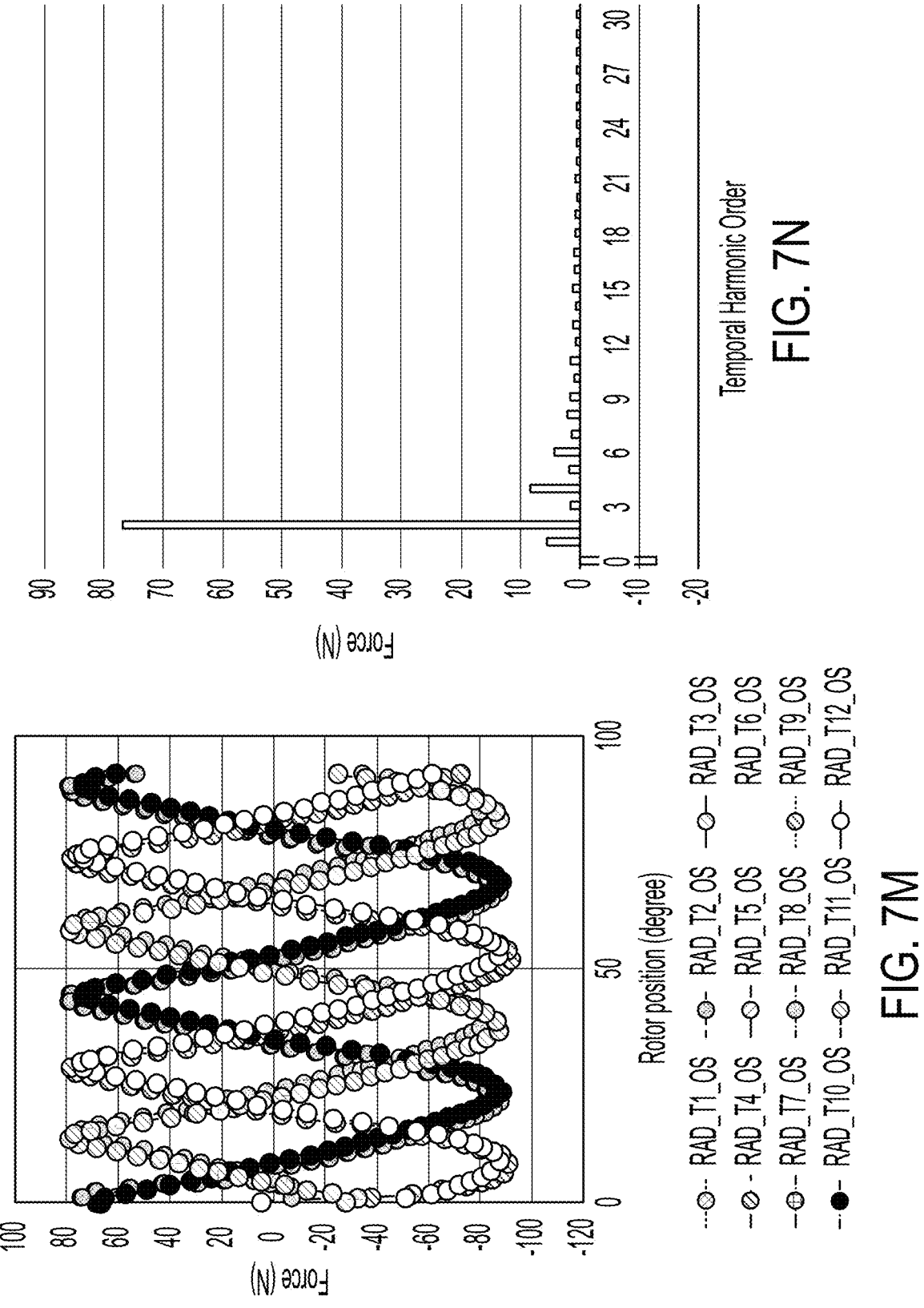
Figure 7O:
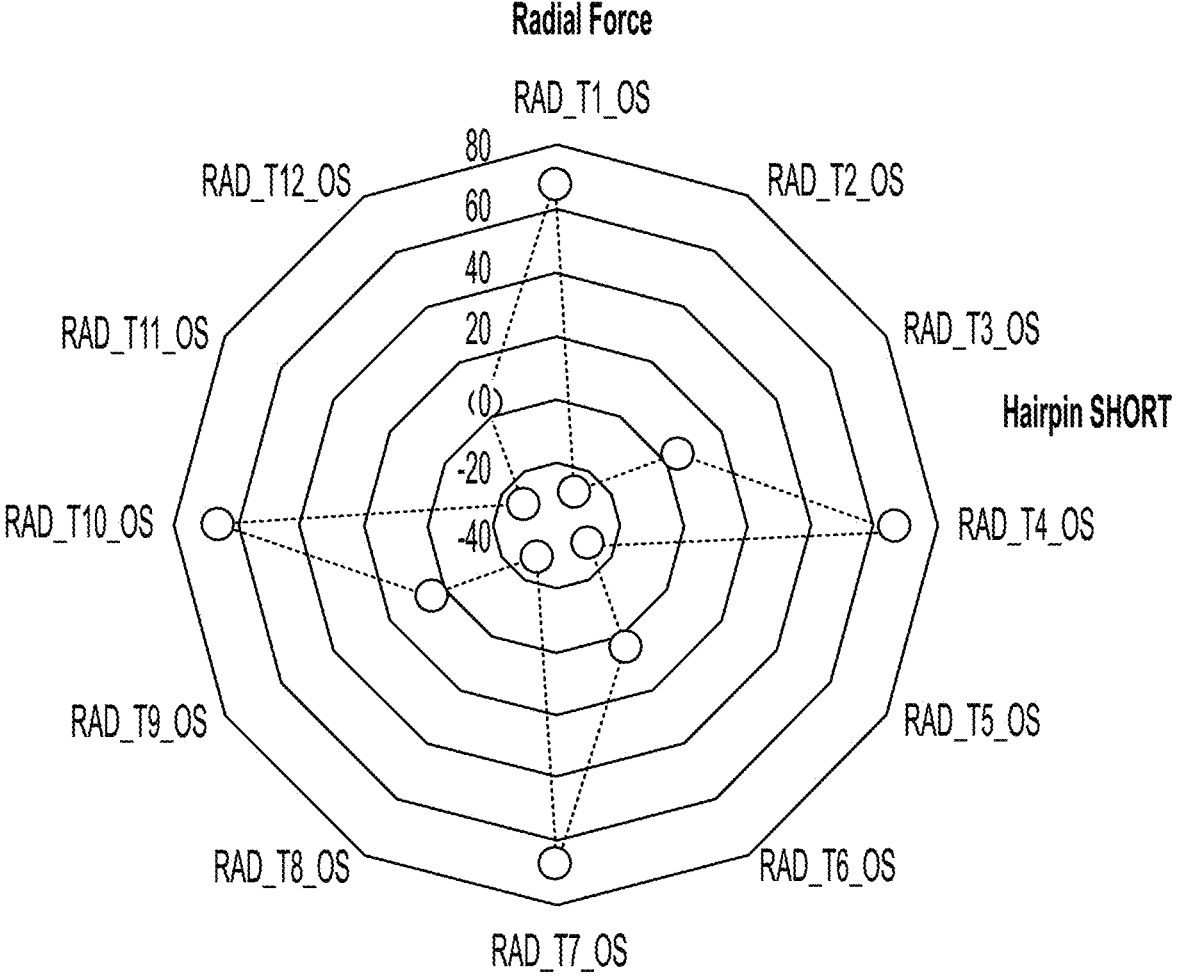

FIGS. 7J-7O generally illustrate passive damping using a radial airgap force. FIGS. 7J-7L illustrate a peak operating condition e.g., a 30 A phase current at 500 rpm motor speed). FIGS. 7M-7O generally illustrate a second quadrant operation (e.g., 30 A phase current at 500 rpm).

Figure 7Q:
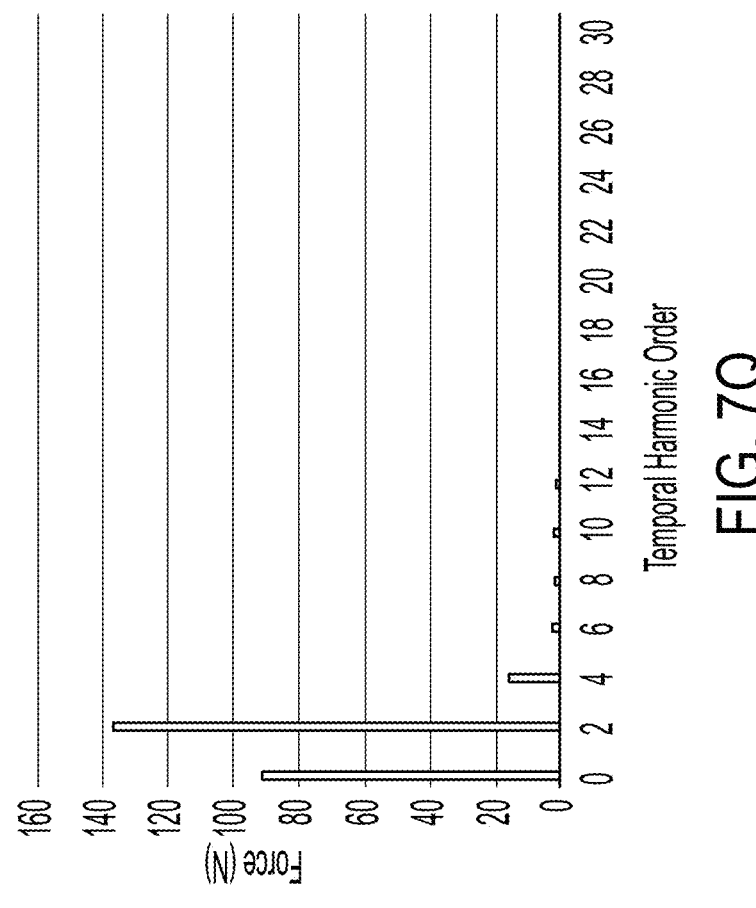
Figure 7P:
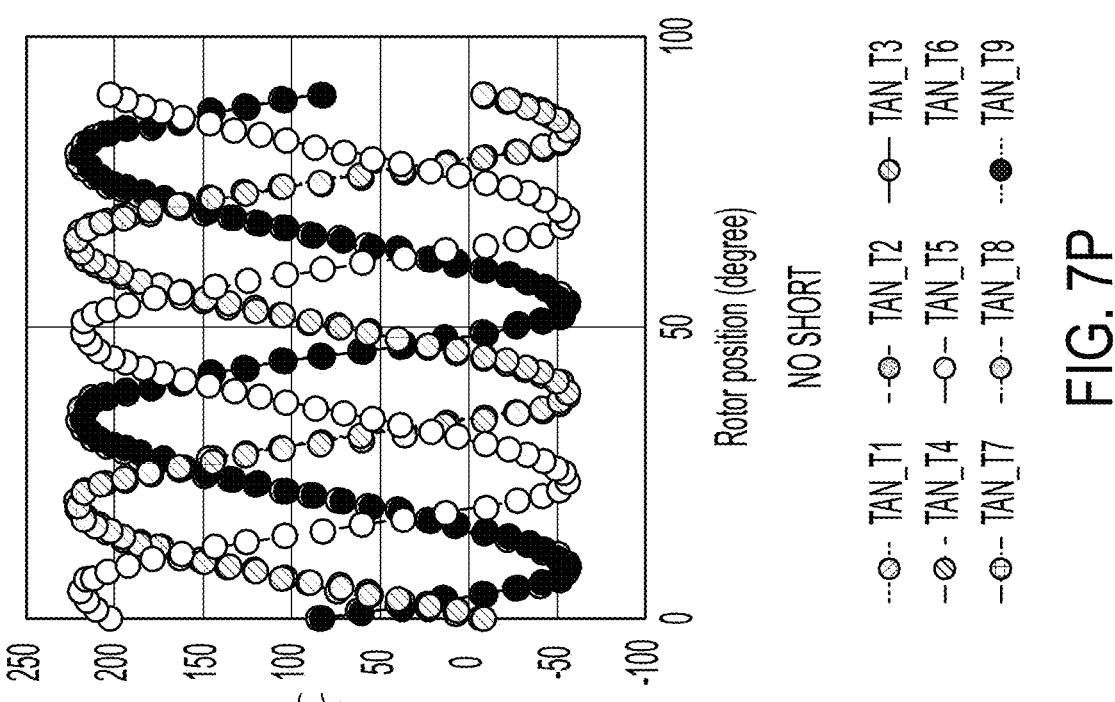
Figure 7R:
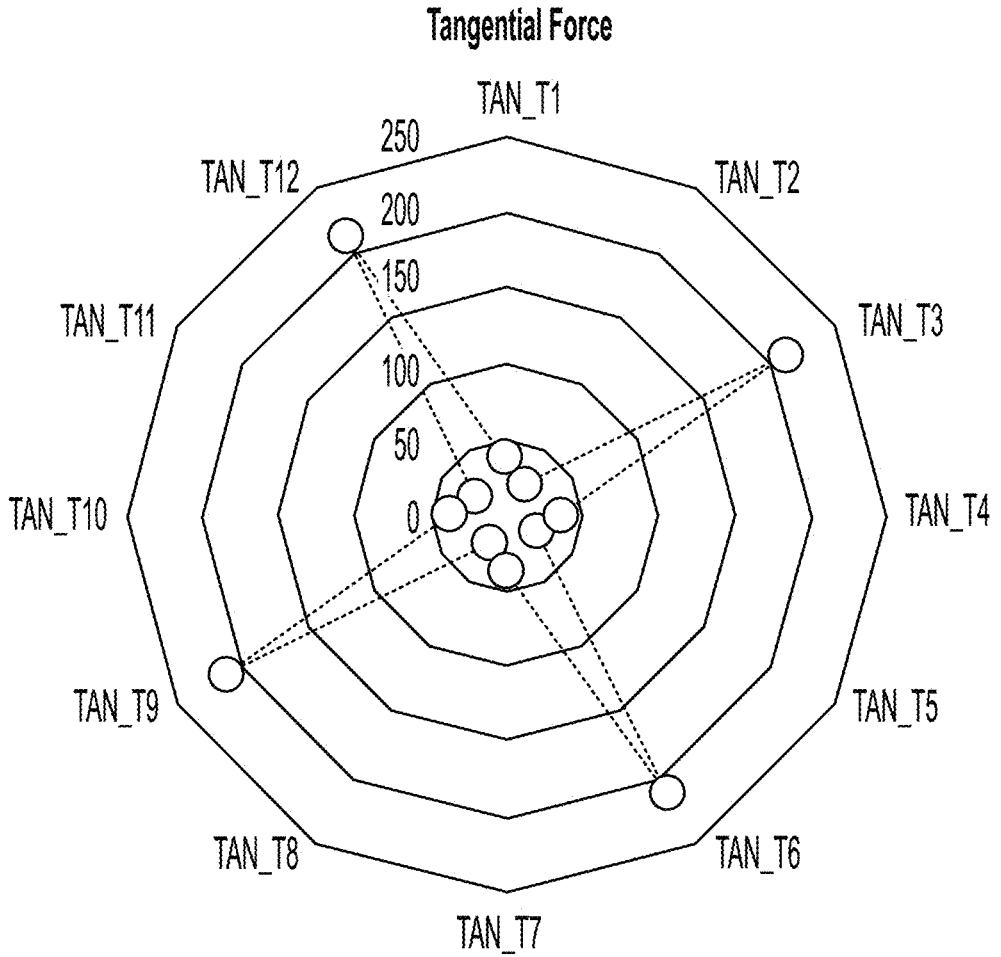
Figure 7T:
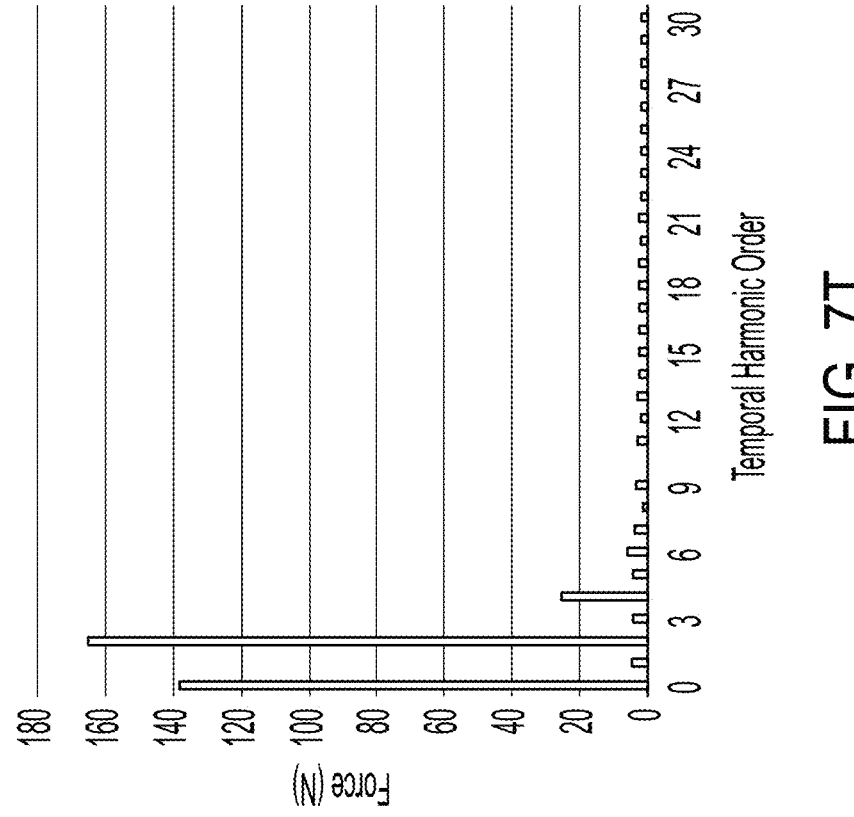
Figure 7S:
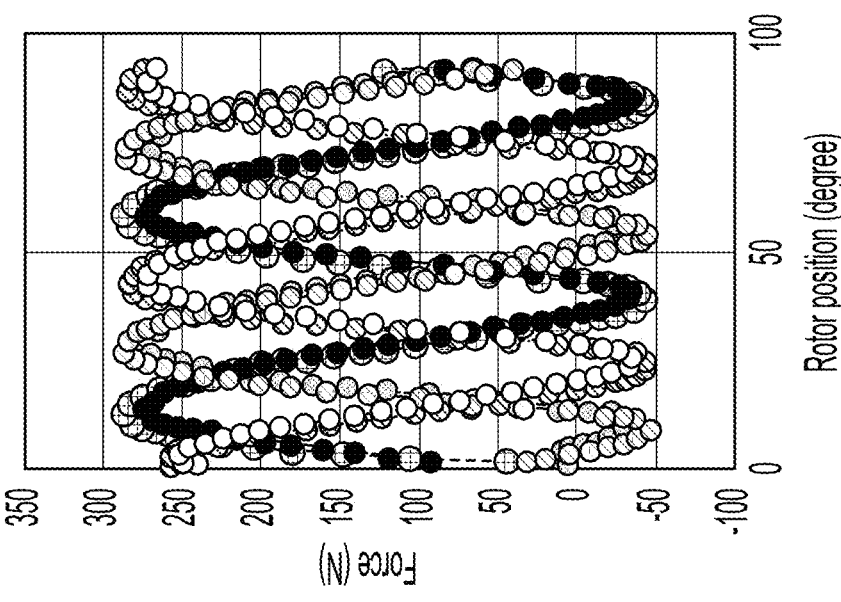
Figure 7U:
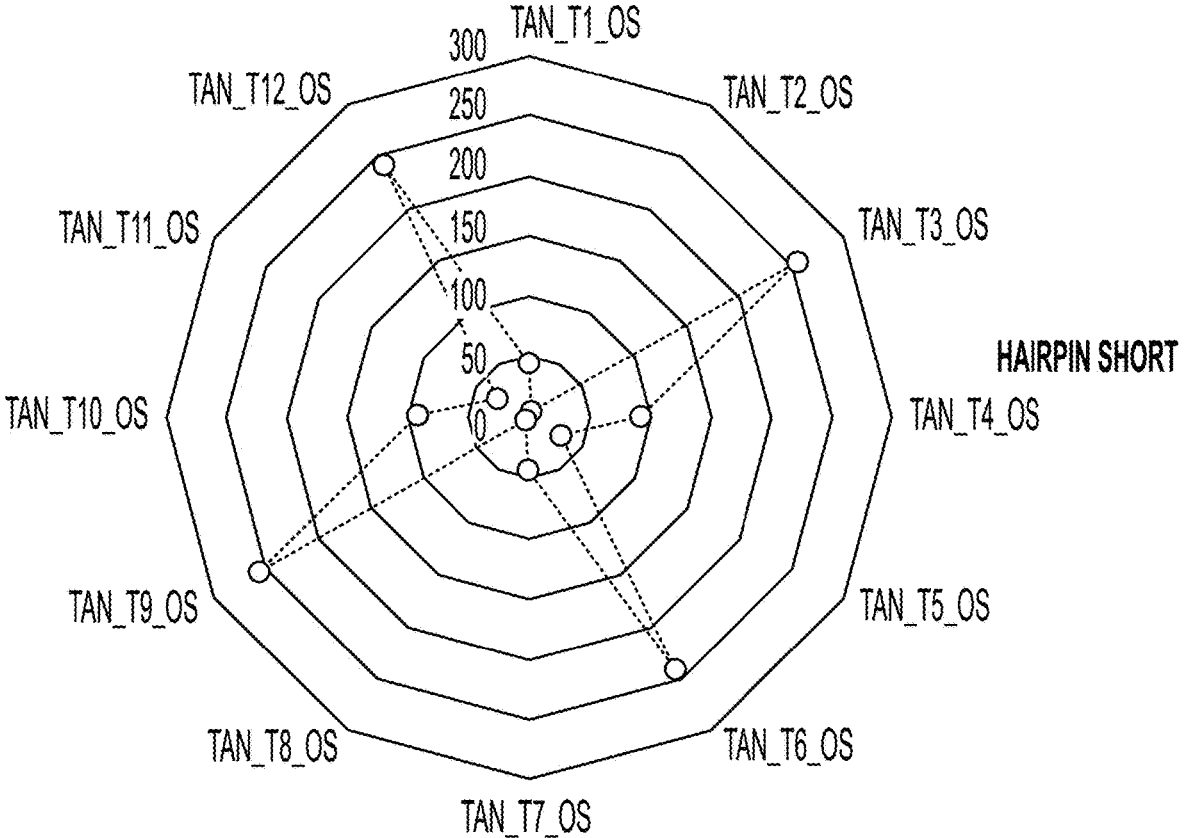

FIGS. 7P-7U generally illustrate passive damping using a tangential airgap force. FIGS. 7P-7R illustrate a peak operating condition in the first quadrant (e.g., 30 A phase current at 500 rpm motor speed). A more balanced force distribution is seen with the hair pin windings short compared to the ¼ motor shorted case. FIGS. 7S-7U generally illustrate a second quadrant operation (e.g., 30 A phase current at 500 rpm).

FIGS. 7V-7Y generally illustrate passive damping using an airgap force. The peak operating condition is illustrated at 30 A phase current at 500 rpm motor speed for the second quadrant. As is illustrated, a 2D-FFT resulted in lower order spatial harmonics having lower magnitude in the hair pin shorted case unlike the 12/8 quarter motor shorted one. A peak magnitude of dominant temporal orders increase in the hair pin motor compared to the no shorts case.

Figure 7Z:
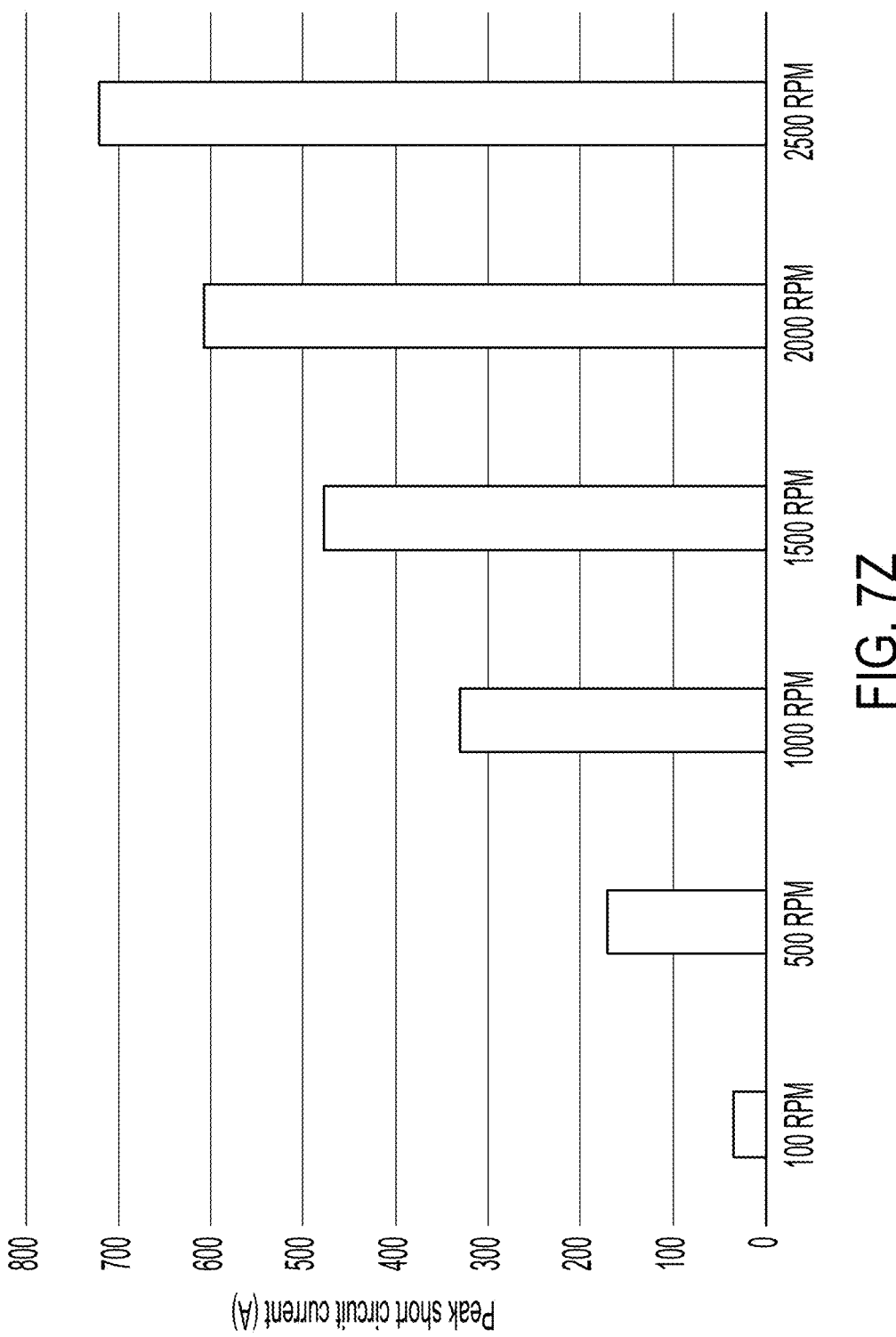

FIG. 7Z generally illustrates passive damping using short circuit current. As is illustrated, a relatively high short circuit in the hair pin windings. In some embodiments, the systems and methods described herein may be configured to tune the hair pin winding resistance.

Figure 8D:
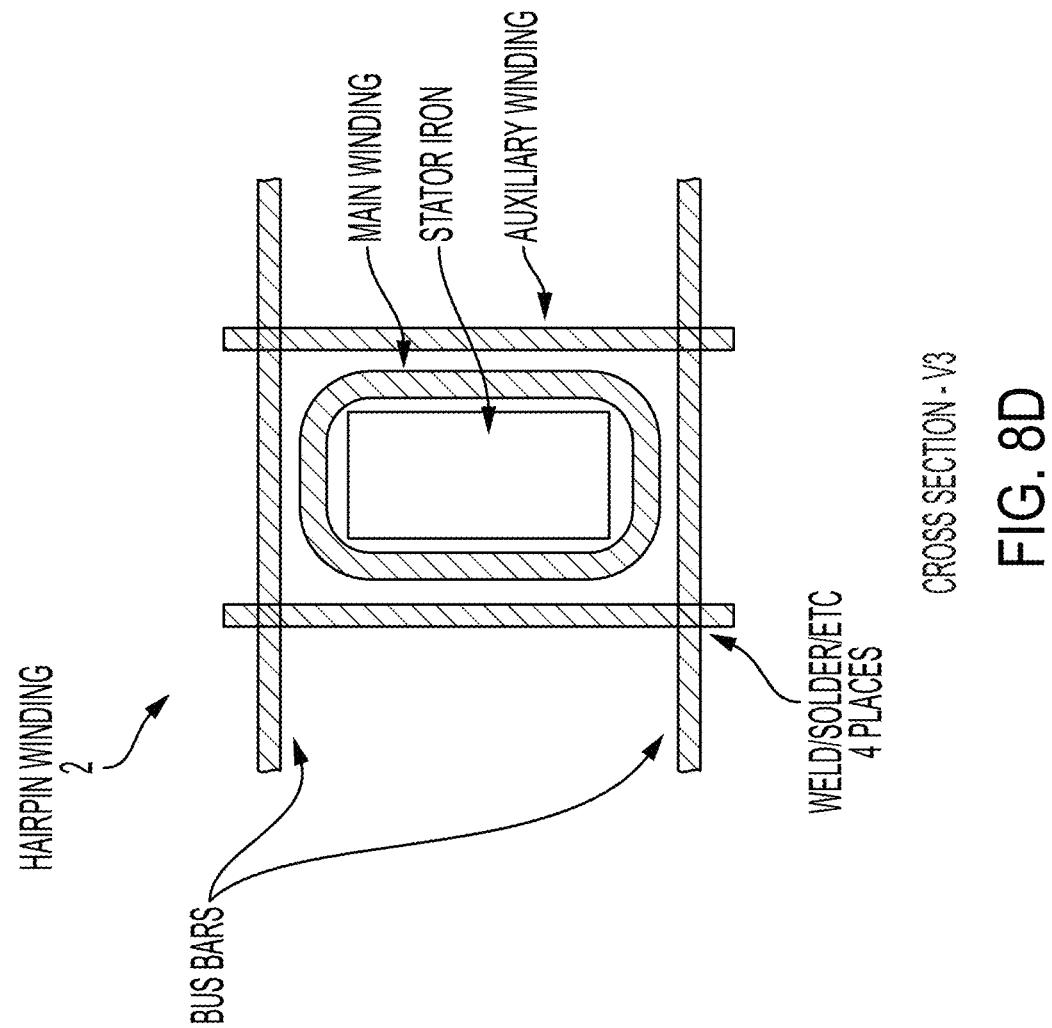
Figure 8E:
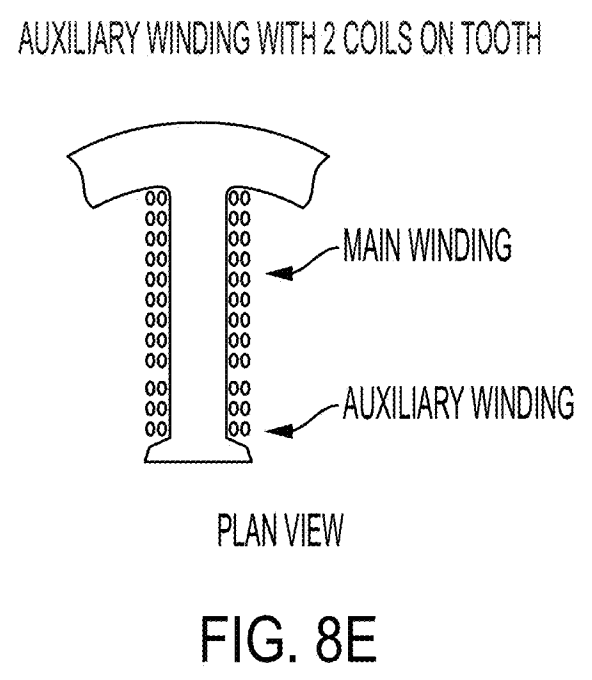

FIG. 8A generally illustrates a plan view of a hair pin winding according to the principles of the present disclosure. FIG. 8B generally illustrates a cross section view of the hair pin winding of FIG. 8A. FIG. 8C generally illustrates an alternative cross section view of the hair pin winding of FIG. 8A. FIG. 8D generally illustrates a cross section view of an alternatively hair pin winding according to the principles of the present disclosure. FIG. 8E generally illustrates a plan view of an alternatively hair pin winding according to the principles of the present disclosure.

In some embodiments, the systems and methods described herein may be configured to provide passive damping using the hair pin winding having: a main winding having characteristics of 52 turns, 0.644 dia (22 AWG), 4 parallel paths, Ke=0.0722 V-s/rad, R=114 mOhms, and L=331 uH; and a damping winding having characteristics of 12 turns, 0.644 dia (22 AWG), 1 parallel path, Ke=00.667 V-s/rad, R=426.5 mOhms, and L=282 uH. Additionally, or alternatively, the damping winding with a wye connected resistor network of R=100 mOhms. The damping winding may provide 1.3 Nm of motor torque at 1875 rpm. Additionally, or alternatively, the damping winding current may be 25 A at 1875 rpm and the shorting resistors may dissipate 25 W each at 1875 rpm. At 1875 rpm, the current density in the damping winding may be 75 $A/mm^2$.

In some embodiments, the systems and methods described herein may be configured to provide enhanced passive damping behavior of the SbW HWA motor. The systems and methods described herein may be configured to use distributed shortened windings, which may improve torque ripple characteristics and may balance an inductance matrix.

Figure 10B:
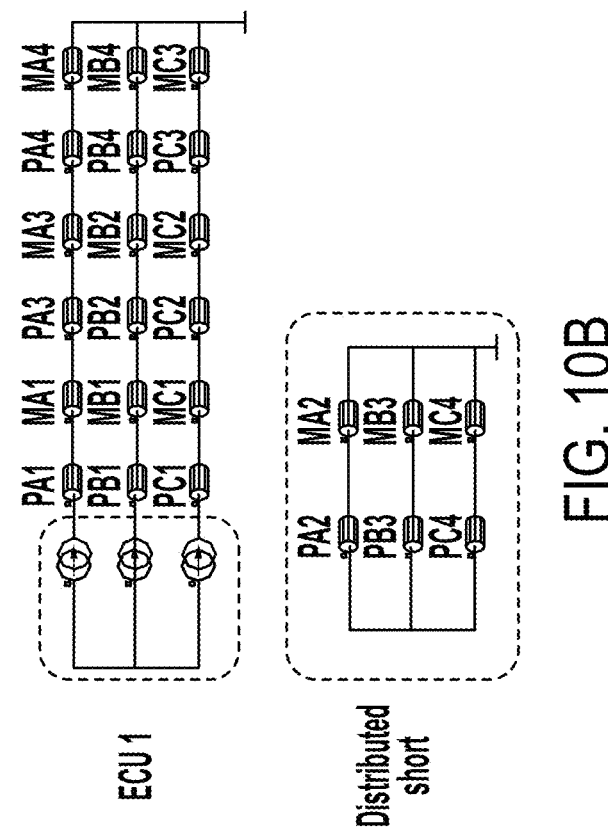
FIGS. 10A and 10B generally illustrate various aspects of a motor characteristics according to the principles of the present disclosure.
Figure 10A:
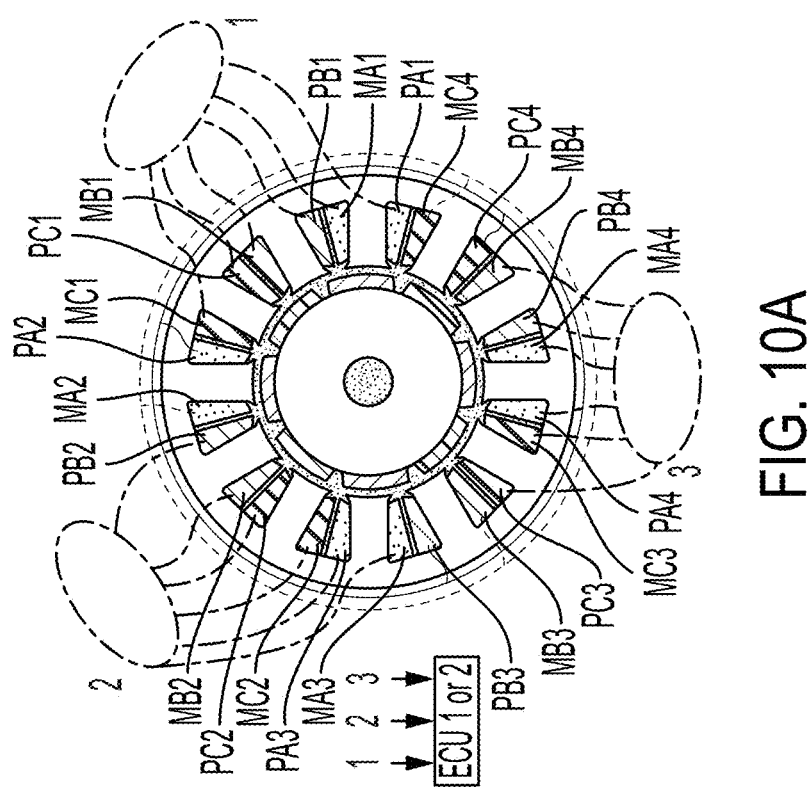

FIG. 10A generally illustrates a stator winding distribution of a motor (e.g., a 12/8 motor) with a single ECU and a shorted segment of winding and FIG. 10B generally illustrates a circuit diagram associated with the motor of FIG. 10A. It should be understood that while a 12/8 motor is illustrated in FIG. 10A, the systems and methods described herein may be applied to any suitable motor. Each component (PA2, MA2, PB3, MB3, PC4 and MC4) of the shorted segment in FIG. 10B has a resistance of Rshort with a Nshort number of turns. Therefore, the phase resistance is 2*Rshort.

In some embodiments, the systems and methods described herein may be configured to provide required damping and/or braking torque while maintaining normal (e.g., desired or expected) operation in a SbW HWA system. The systems and methods described herein may be configured to use shorted windings disposed at an obtuse angle (e.g., 120 degrees or other suitable angle) mechanically apart throughout the stator slots to provide a balanced interaction with the active windings.

Motor shorting, without proper design optimization, may lead to undesirable damping behavior, high short circuit current with thermal consequences, degraded performance under normal operation, interference with normal (e.g., not shorted) winding sets, and/or loss of stability and control of the system. Accordingly, the systems and methods described herein may be configured to: provide shorted windings to regulate damping behavior over speed; avoid interference with other components of the motor, steering system, or other suitable associated components; avoid loss of control or stability due to interference between motor winding sets; provide desired winding technology and lamination; reduce second order torque ripple harmonics; reduce torque ripple harmonics; and/or improve balance characteristics of an associated inductance matrix.

The systems and methods described herein may be configured to provide an optimum winding design strategy for passive damping implementation in a SbW HWA motor (e.g., with both first quadrant and second quadrant operations of the motor validated). Additionally, or alternatively, the systems and methods descried herein may be validated at low speed, medium speed, and high-speed for operation in second quadrant.

The systems and methods described herein may be configured to provide relatively more balanced operation using a distributed short winding topology, which may reduce the torque ripple percentage and make the inductance matrix more balanced. The short windings may be disposed 120 degrees mechanically apart to distribute the shorted windings uniformly.

Figures 11A, 11B:
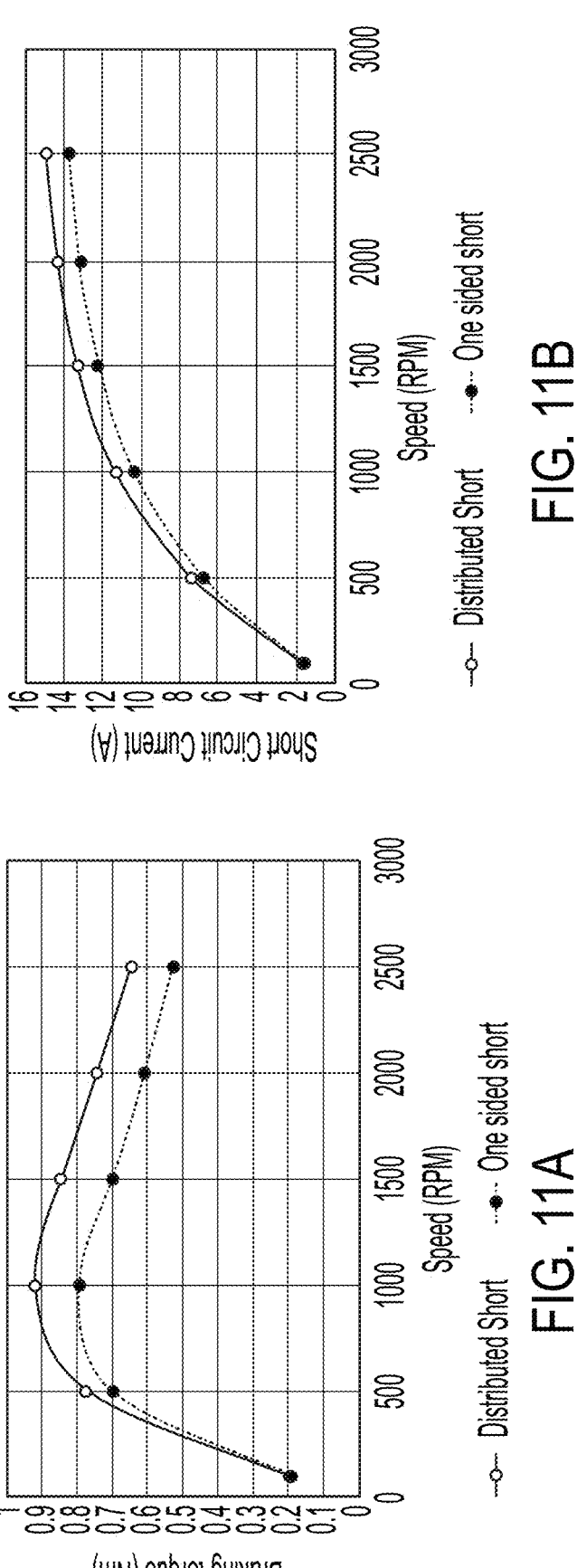
FIGS. 11A-11Z generally illustrate various aspects of a motor characteristics according to the principles of the present disclosure.
Figures 11C, 11D, 11E, 11F:
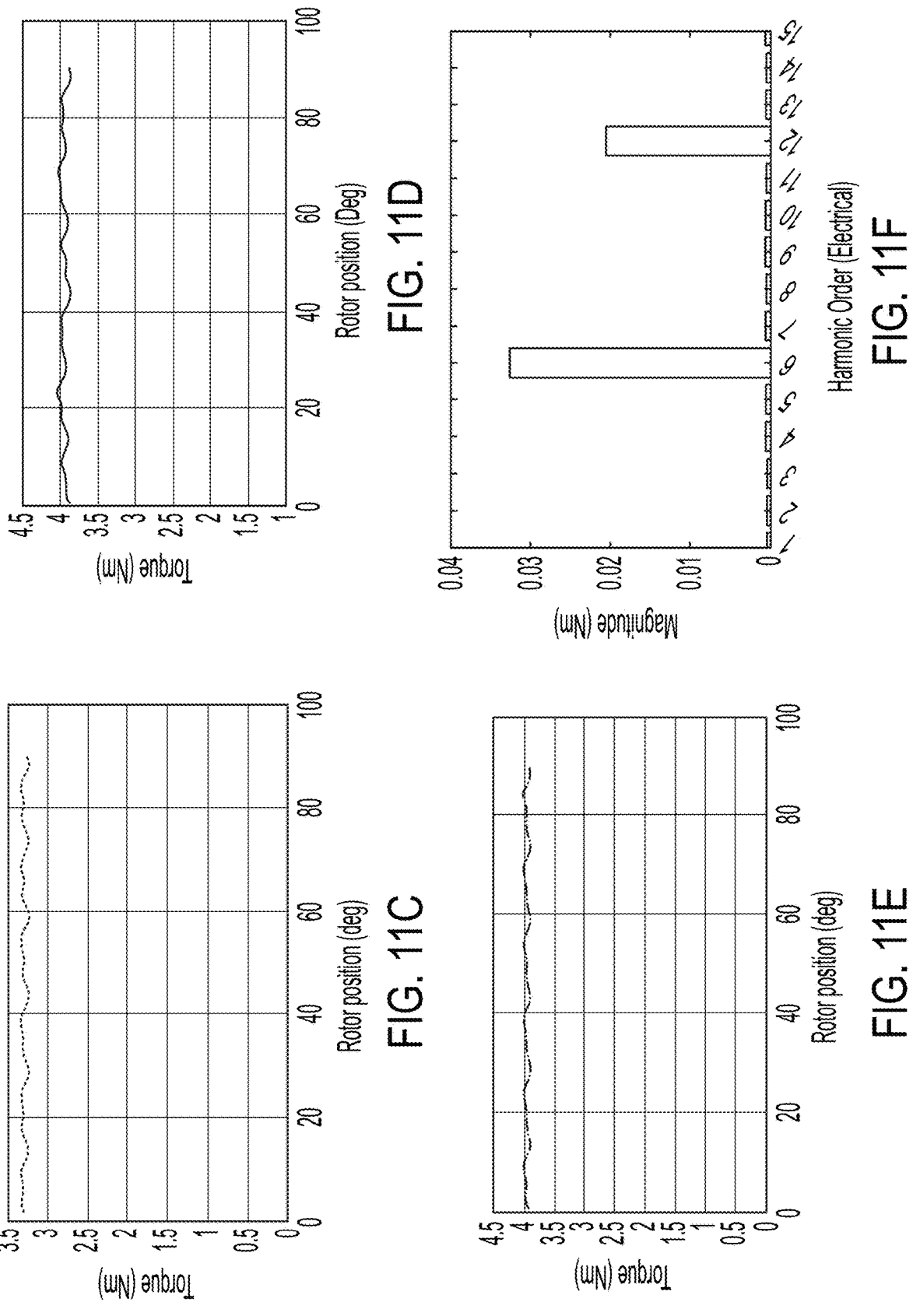
Figure 11H:
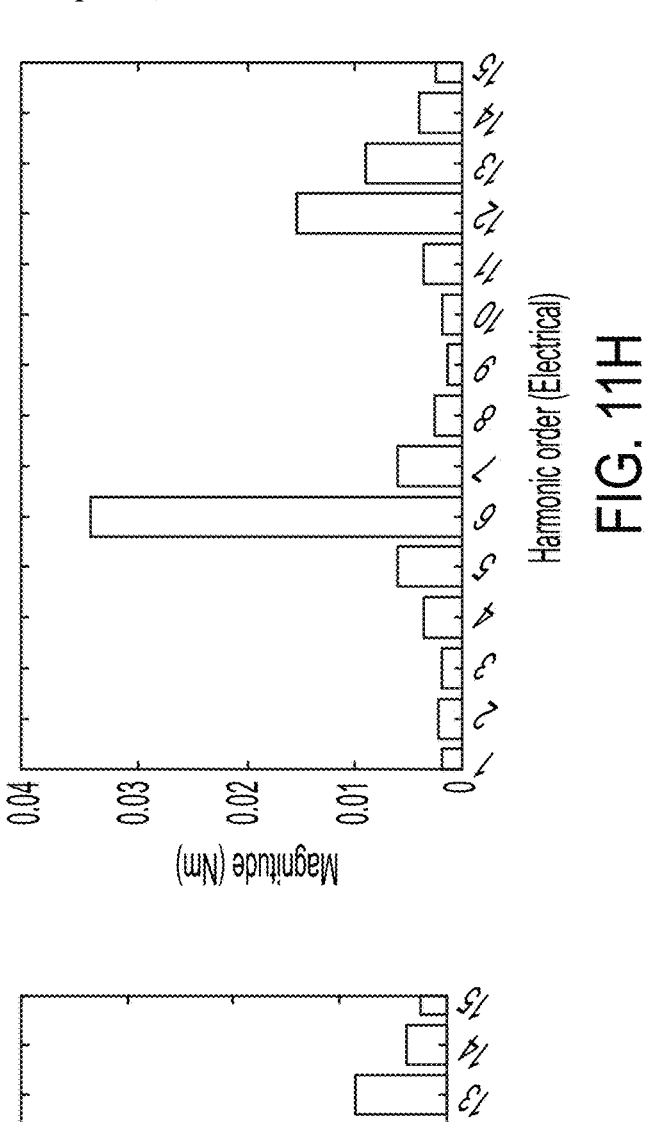
Figure 11G:
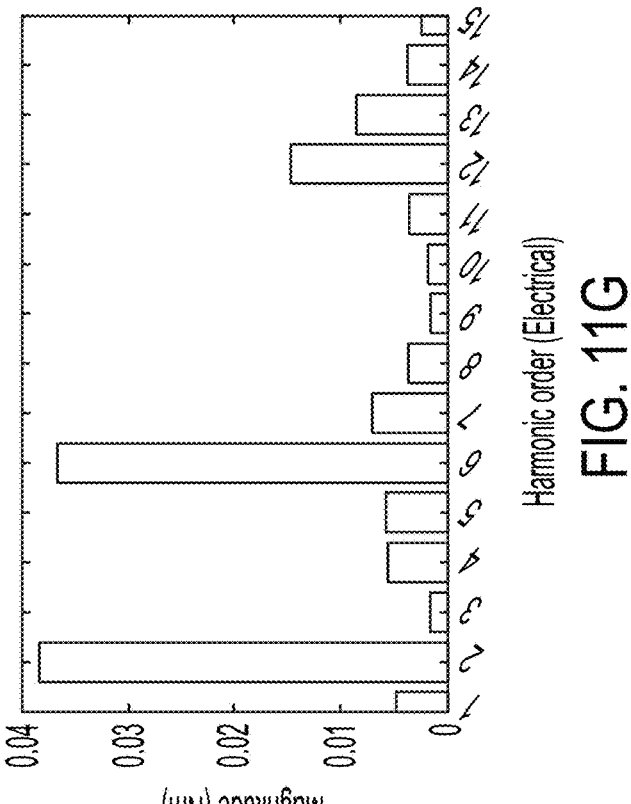
Figures 11I, 11J, 11K, 11L:
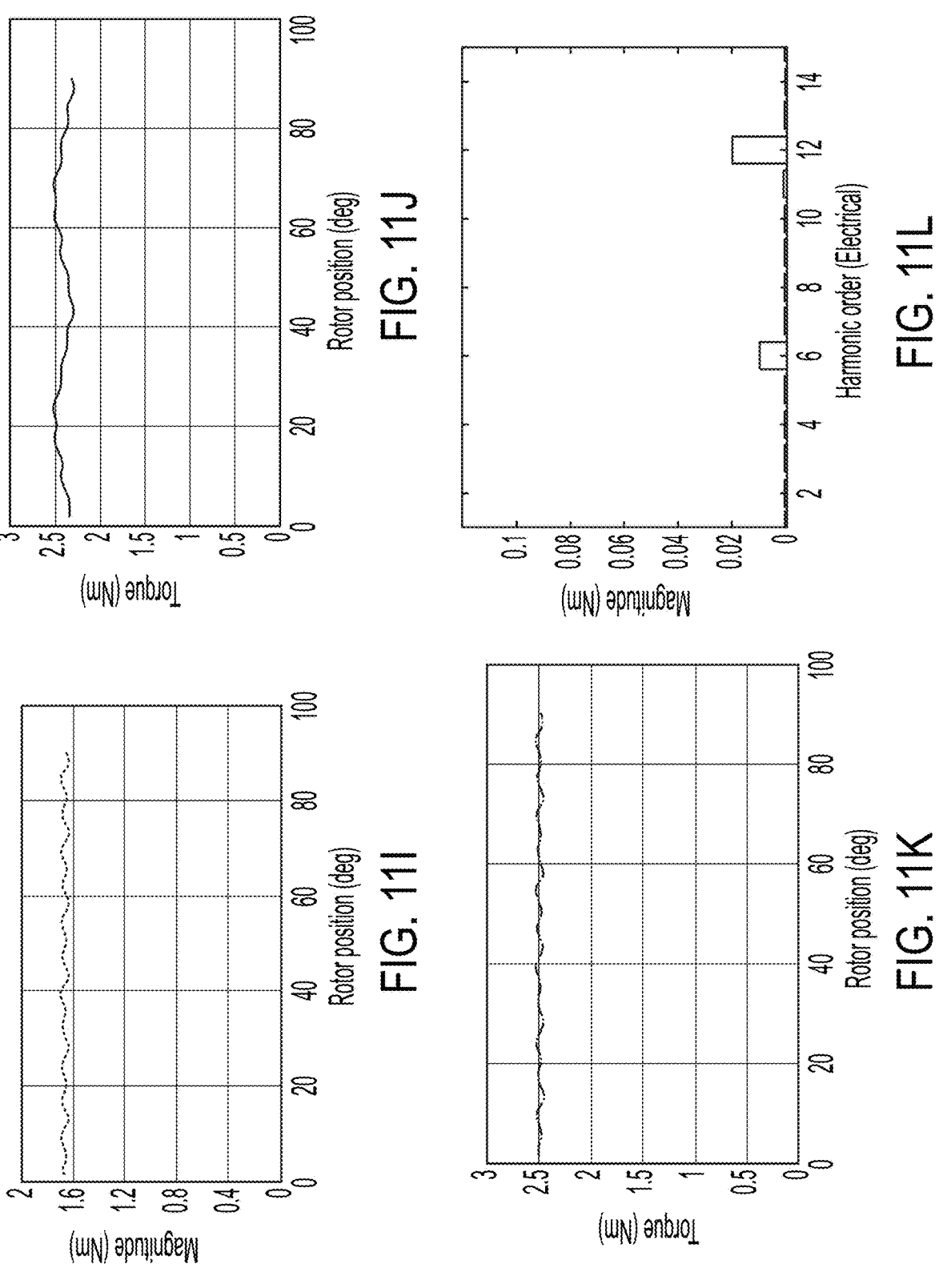
Figure 11N:
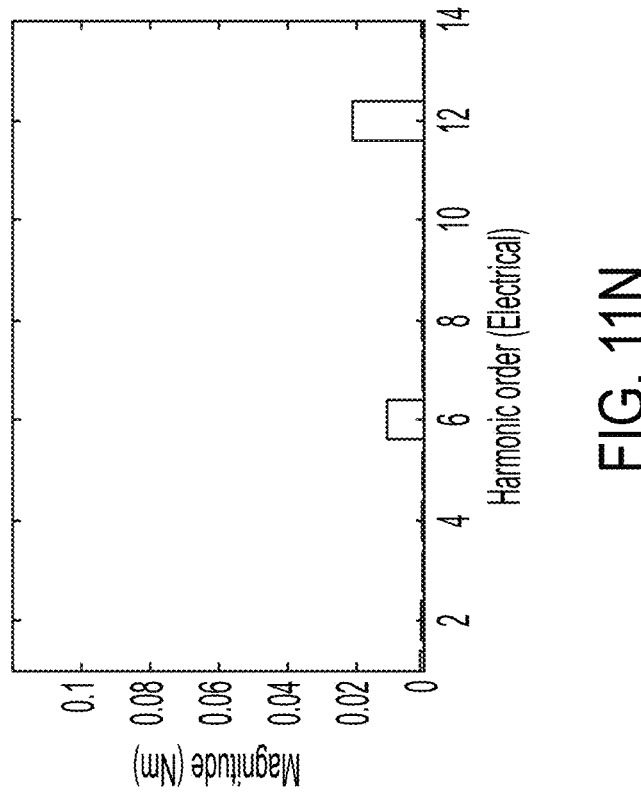
Figure 11M:
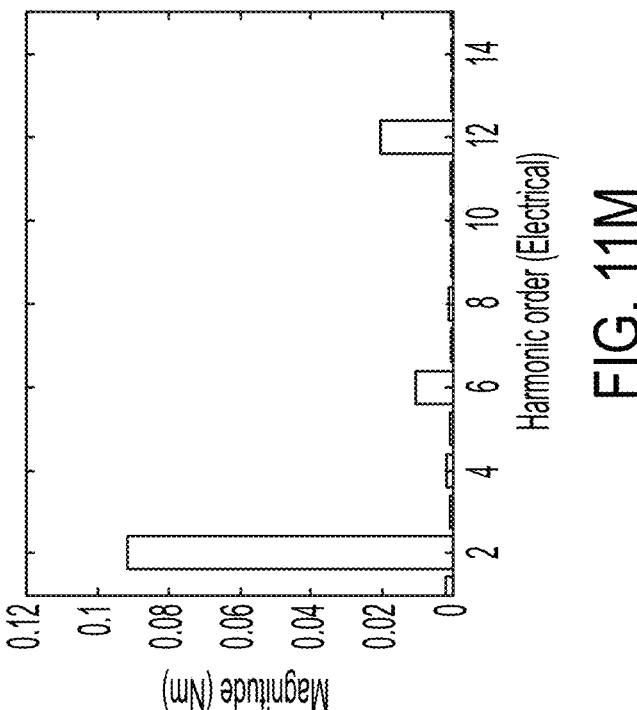
Figures 11O, 11P, 11Q, 11R:
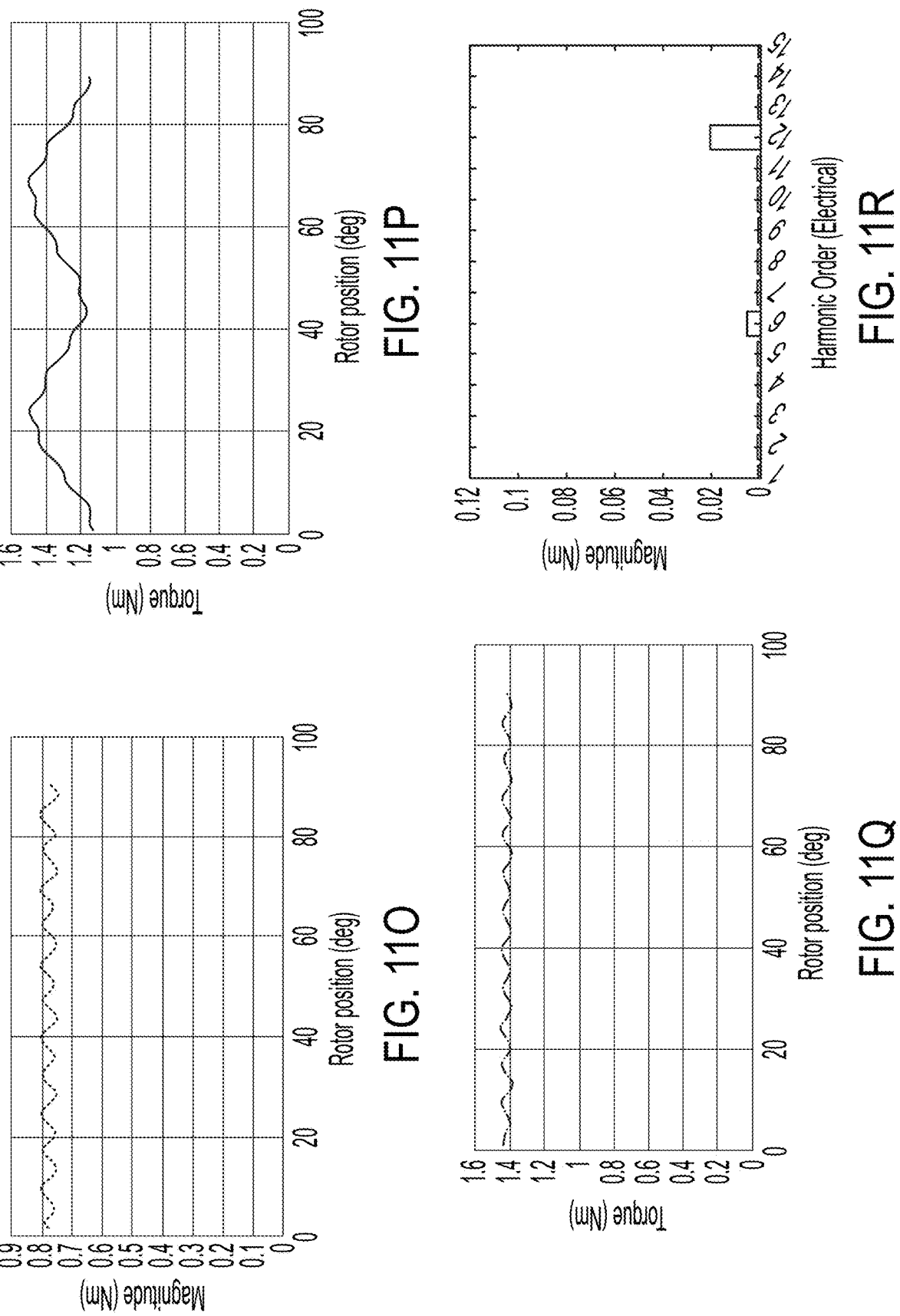
Figure 11T:
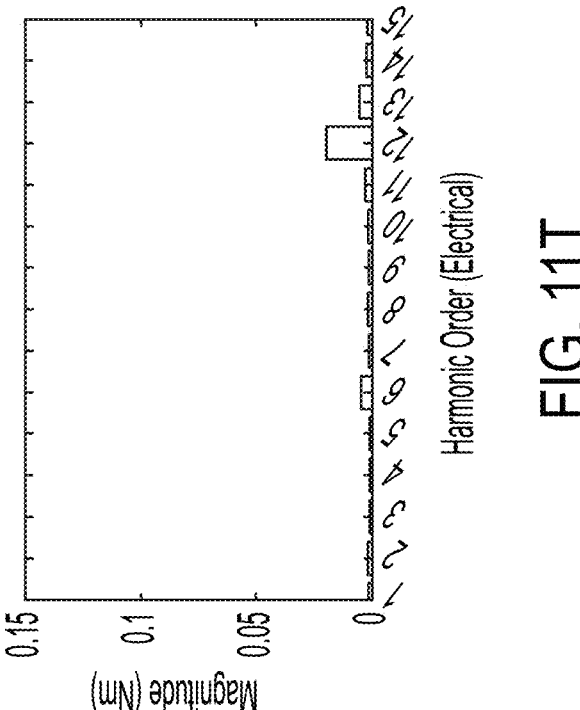
Figure 11S:
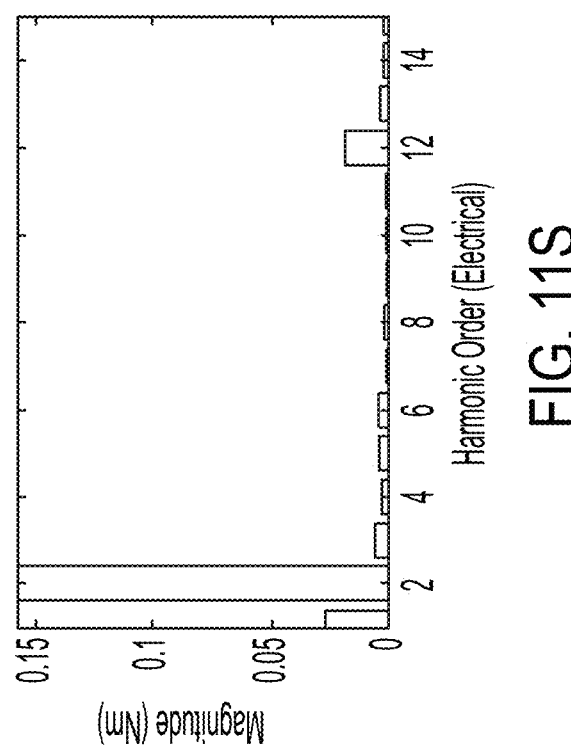
Figures 11U, 11V, 11W, 11X:
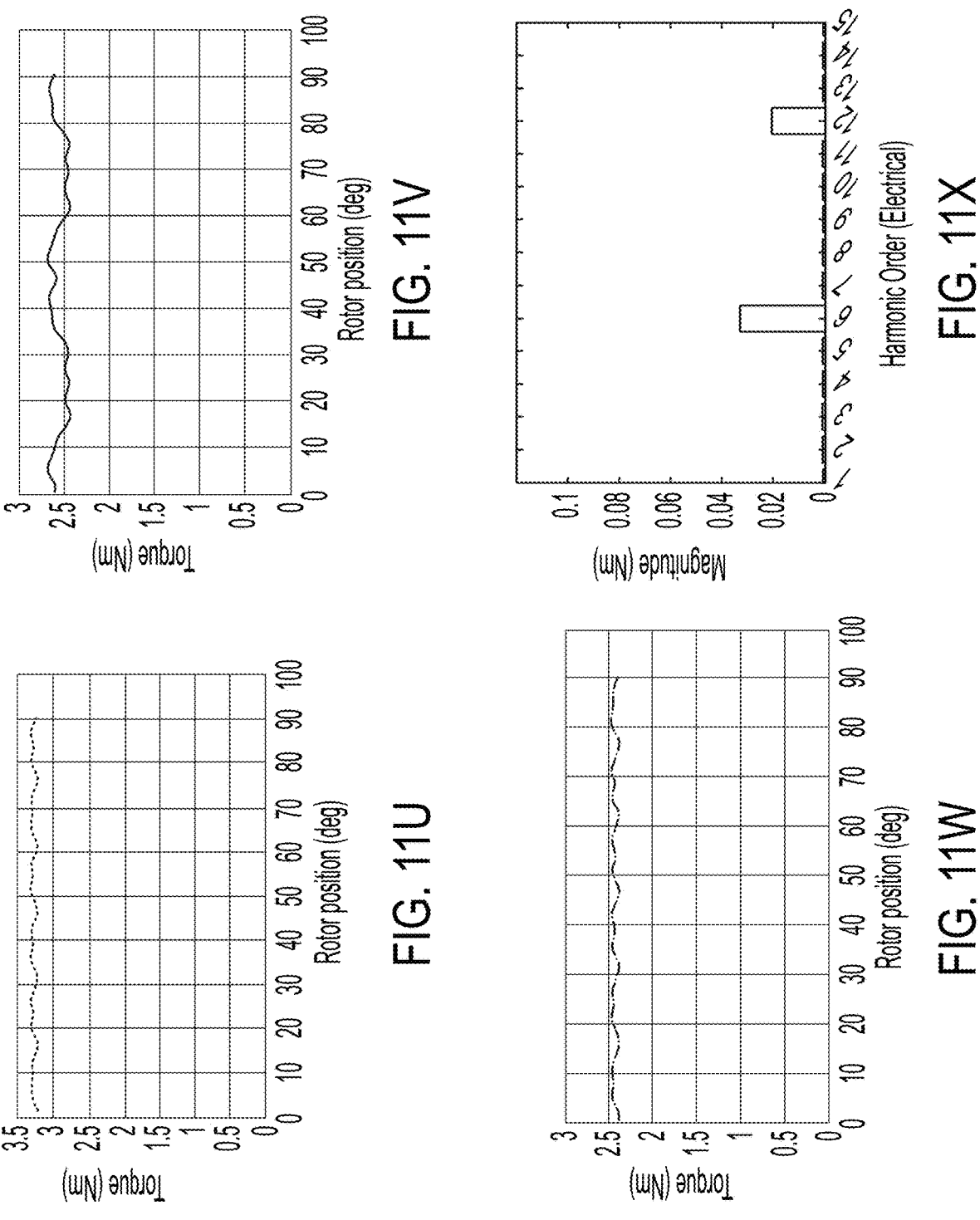
Figures 11Y, 11Z:
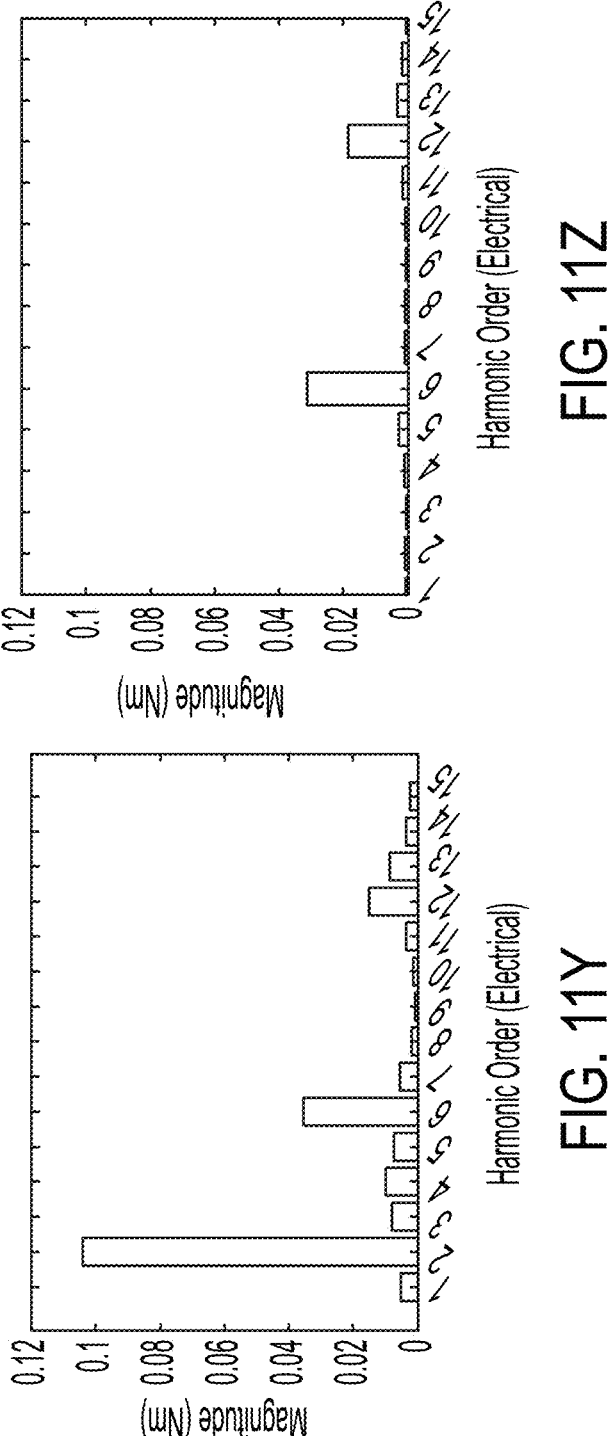

With Respect to FIGS. 11A-11Z, various characteristics of the motor illustrated in FIG. 10A are generally illustrated. Considering the same phase resistance for the distributed short and the one-sided short topology, the simulated braking torque and the short circuit current are shown in FIGS. 11A and 11B. As the end winding connections are changing for the distributed short case, the resistance value can increase slightly which can eventually reduce the amount of braking torque and the short circuit current. Moreover, the number of turns, number of wires in hand and even the material of the winding (e.g., such as aluminum instead of copper and the like) can be changed to alter the shorted winding resistance, which in turn changes the braking torque behavior with speed. This alteration of the braking torque in the handwheel actuator can be used to tune steering feel.

The output torque in 500 RPM 30 A peak phase current for no short (e.g., which is the conventional machine) without any passive damping approach, one sided short and distributed short winding methods are shown in FIGS. 11C-11H. For example, the second order (electrical) is reduced significantly.

Comparison of the output torque performance for the medium speed operation 1100 rpm 15 A peak phase current are shown in FIGS. 11I-11N. For example, the large second order torque ripple harmonics are eliminated for the distributed short winding approach. The torque ripple percentage may be lower (e.g., 77% lower) than the distributed short winding approach.

The output torque performance of the 500 rpm 30 A of the first quadrant operation for the no short, one-sided short and the distributed short winding structures are shown in FIGS. 11U-11Z, where the second order torque ripple harmonics are eliminated. The torque ripple percentage may be reduced by 63.2% through the distributed short winding approach.

In some embodiments, the systems and methods described herein may be configured to provide a more balanced inductance matrix, which will help to more easily control the machine. For example, the coupling between the shorted windings and the windings connected to the ECUs are relatively strong for the distributed and the balanced inductance may improve the control of the distributed short windings more effectively.

In some embodiments, the systems and methods described herein may be configured to provide damping and/or braking torque by shorting the windings of a PMSM in a more distributed manner rather than shorting them consecutively. The systems and methods described herein may be configured to dispose the shorted windings 120 degrees mechanically apart in the stator. The systems and methods described herein may be configured to reduce torque ripple for low speed, medium speed, and high speed in the second quadrant operation. The systems and methods described herein may be configured to reduce second order (e.g., electrical) harmonics of the torque for low speed, medium speed, and high speed in the second quadrant operation. The systems and methods described herein may be configured to reduce torque ripple for the first quadrant operation. The systems and methods described herein may be configured to reduce second order (e.g., electrical) harmonics of the torque for first quadrant operation. The systems and methods described herein may be configured to balance the inductance matrix for both the first quadrant and second quadrant matrix operation. The systems and methods described herein may be configured to avoid changes to associated components. The systems and methods described herein may be configured to use various materials and number of turns of the shorted winding to alter the amount of braking torque.

In some embodiments, the systems and methods described herein may be configured to select a number of windings for a motor of a handwheel actuator. The systems and methods described herein may be configured to short a subset of windings of the number of windings. Each winding of the subset of windings may be disposed at an obtuse angle from each other winding of the subset of windings. The obtuse angle may include any suitable obtuse angle, such as a 120 degree angle or other suitable angle. The systems and methods described herein may be configured to determine a resistance value for the motor. The systems and methods described herein may be configured to selectively adjust the resistance value based on a number of windings associated with the subset of windings. The systems and methods described herein may be configured to provide, in series with the subset of windings, at least one metal-oxide-semiconductor field-effect transistor (MOSFET) configured to: vary the resistance associated with the subset of windings based on a vehicle speed; and tune a damping characteristic associated with the handwheel actuator.

In some embodiments, the at least one MOSFET includes a depletion/enhanced mode MOSFET. In some embodiments, the motor includes a 9/6 motor. In some embodiments, the motor includes a 12/8 motor. In some embodiments, the motor includes a permanent magnet synchronous machine. In some embodiments, the motor includes a surface mounted permanent magnet synchronous machine.

Figure 1:
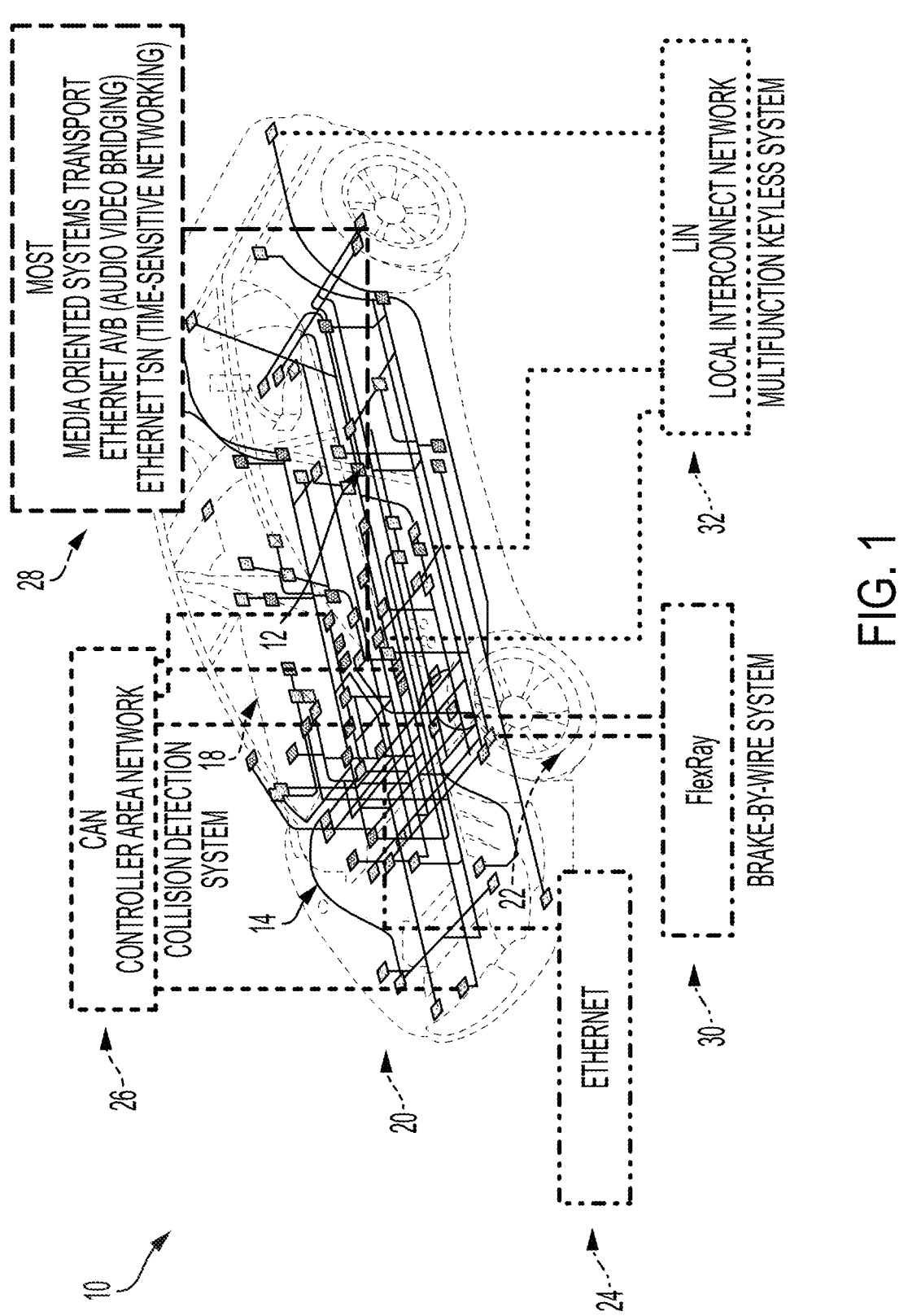
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
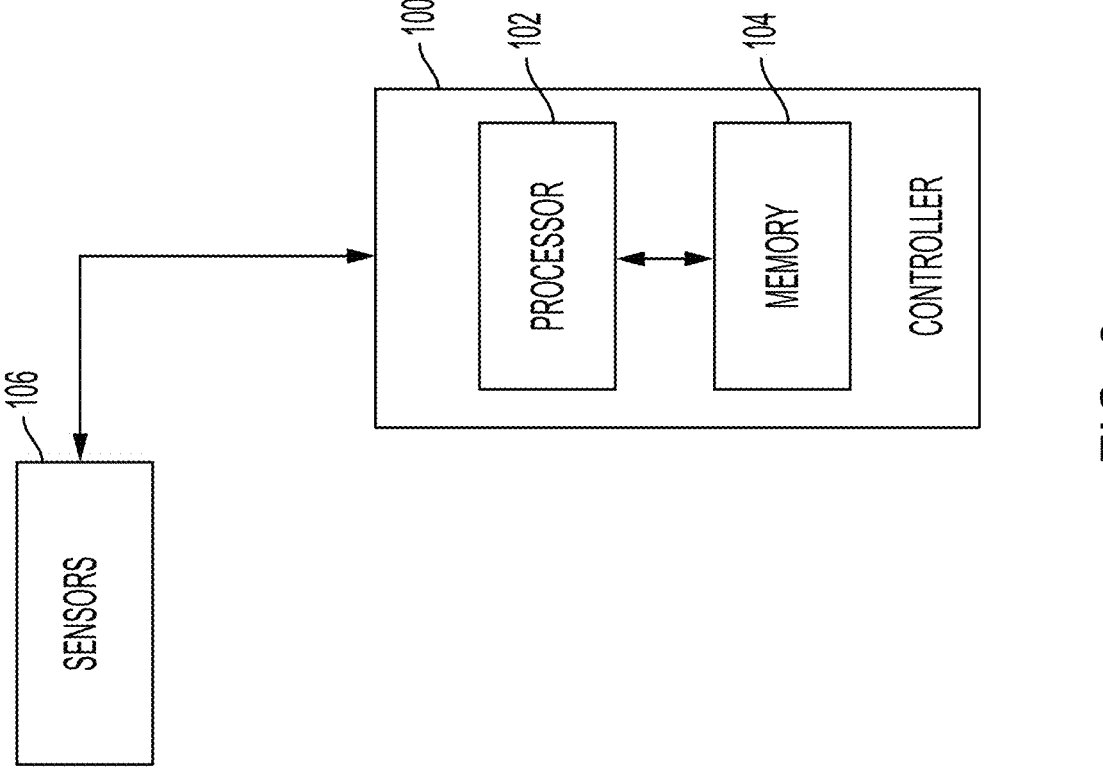
FIG. 2 generally illustrates a controller according to the principles of the present disclosure.

In some embodiments, the steering system may include a steering system controller, such as controller 100, as is generally illustrated in FIG. 2. The controller 100 may include any suitable controller. The controller 100 may be configured to control, for example, the various functions of the steering system. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various functions of the steering system.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angel, a motor velocity, a vehicle speed, other suitable information, or a combination thereof.

In some embodiment, the controller 100 may be configured to select a number of windings for a motor of a handwheel actuator. The motor may include a 9/6 motor, a 12/8 motor, or other suitable motor. The motor may include a PMSM, such as an SPMSM or other suitable motor. The controller 100 may short a subset of windings of the number of windings. The controller 100 may determine a resistance value for the motor. The controller 100 may selectively adjust the resistance value based on a number of windings associated with the subset of windings. The controller 100 may provide, in series with the subset of windings, at least one MOSFET configured to vary the resistance associated with the subset of windings based on a vehicle speed, and tune a damping characteristic associated with the handwheel actuator. The at least one MOSFET may include a depletion/enhanced mode MOSFET or other suitable MOSFET.

In some embodiment, the controller 100 may be configured to select a number of windings for a motor of a handwheel actuator. The motor may include a 9/6 motor, a 12/8 motor, or other suitable motor. The motor may include a PMSM, such as an SPMSM or other suitable motor. The controller 100 may short a subset of windings of the number of windings. Each winding of the subset of windings may be disposed at an obtuse angle from each other winding of the subset of windings. The obtuse angle may include any suitable obtuse angle, such as a 120 degree angle or other suitable angle. The controller 100 may determine a resistance value for the motor. The controller 100 may selectively adjust the resistance value based on a number of windings associated with the subset of windings. The controller 100 may provide, in series with the subset of windings, at least one MOSFET configured to vary the resistance associated with the subset of windings based on a vehicle speed, and tune a damping characteristic associated with the handwheel actuator. The at least one MOSFET may include a depletion/enhanced mode MOSFET or other suitable MOSFET.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

FIG. 6 is a flow diagram generally illustrating a passive damping method 400 according to the principles of the present disclosure. At 402, the method 400 selects a number of windings for a motor of a handwheel actuator.

At 404, the method 400 shorts a subset of windings of the number of windings. At 406, the method 400 determines a resistance value for the motor.

At 408, the method 400 selectively adjusts the resistance value based on a number of windings associated with the subset of windings.

At 410, the method 400 provides, in series with the subset of windings, at least MOSFET configured to vary the resistance associated with the subset of windings based on a vehicle speed, and tune a damping characteristic associated with the handwheel actuator.

Figure 9:
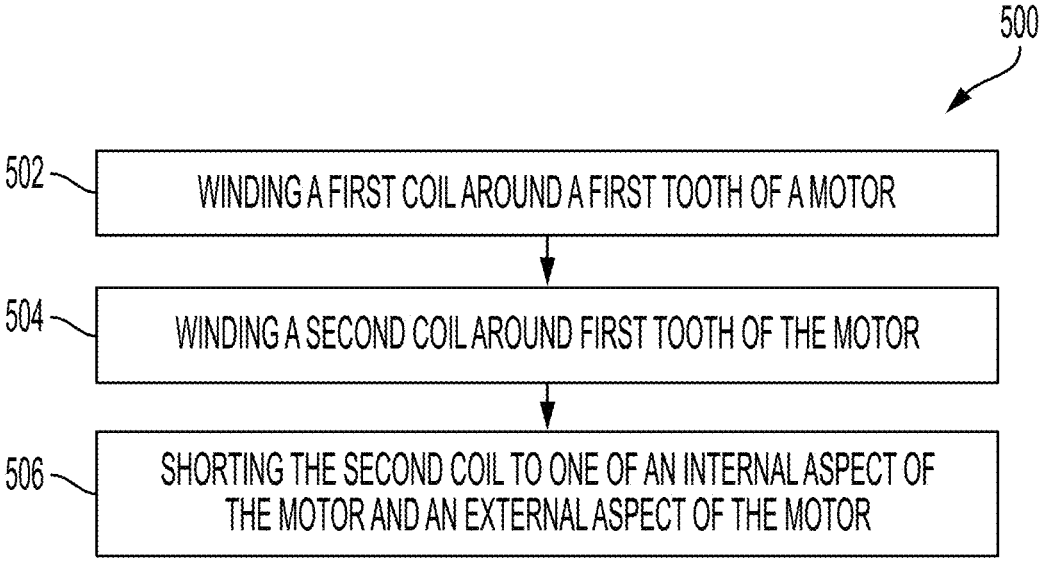
FIG. 9 is a flow diagram generally illustrating an alternative passive damping method according to the principles of the present disclosure.

FIG. 9 is a flow diagram generally illustrating an alternative passive damping method 500 according to the principles of the present disclosure. At 502, the method 500 winds a first coil around a first tooth of a motor.

At 504, the method 500 winds a second coil around first tooth of the motor.

At 506, the method 500 shorts second coil to one of an internal aspect of the motor and an external aspect of the motor.

FIG. 12 is a flow diagram generally illustrating an alternative passive damping method 1200 according to the principles of the present disclosure. At 1202, the method 1200 selects a number of windings for a motor of a handwheel actuator.

At 1204, the method 1200 shorts a subset of windings of the number of windings. At 1206, the method 1200 determines a resistance value for the motor.

At 1208, the method 1200 selectively adjusts the resistance value based on a number of windings associated with the subset of windings.

At 1210, the method 1200 provides, in series with the subset of windings, at least one MOSFET configured to: vary the resistance associated with the subset of windings based on a vehicle speed; and tune a damping characteristic associated with the handwheel actuator.

In some embodiments, a method for passive damping in a steer-by-wire handwheel actuator includes selecting a number of windings for a motor of a handwheel actuator; shorting a subset of windings of the number of windings, each winding of the subset of windings being disposed at an obtuse angle from each other winding of the subset of windings; determining a resistance value for the motor; selectively adjusting the resistance value based on a number of windings associated with the subset of windings; and providing, in series with the subset of windings, at least one metal-oxide-semiconductor field-effect transistor (MOSFET) configured to: vary the resistance associated with the subset of windings based on a vehicle speed; and tune a damping characteristic associated with the handwheel actuator.

In some embodiments, the at least one MOSFET includes a depletion/enhanced mode MOSFET. In some embodiments, the motor includes a 9/6 motor. In some embodiments, the motor includes a 12/8 motor. In some embodiments, the motor includes a permanent magnet synchronous machine. In some embodiments, the motor includes a surface mounted permanent magnet synchronous machine. In some embodiments, the obtuse angle includes a 120 degree angle.

In some embodiments, a system for passive damping in a steer-by-wire handwheel actuator includes a processor and a memory. The memory includes instructions that, when executed by the processor, cause the processor to: select a number of windings for a motor of a handwheel actuator; short a subset of windings of the number of windings, each winding of the subset of windings being disposed at an obtuse angle from each other winding of the subset of windings; determine a resistance value for the motor; selectively adjust the resistance value based on a number of windings associated with the subset of windings; and provide, in series with the subset of windings, at least one metal-oxide-semiconductor field-effect transistor (MOSFET) configured to: vary the resistance associated with the subset of windings based on a vehicle speed; and tune a damping characteristic associated with the handwheel actuator.

In some embodiments, the at least one MOSFET includes a depletion/enhanced mode MOSFET. In some embodiments, the motor includes a 9/6 motor. In some embodiments, the motor includes a 12/8 motor. In some embodiments, the motor includes a permanent magnet synchronous machine. In some embodiments, the motor includes a surface mounted permanent magnet synchronous machine. In some embodiments, the obtuse angle includes a 120 degree angle.

In some embodiments, a method for passive damping in a steer-by-wire handwheel actuator includes selecting a number of windings for a motor of a handwheel actuator; shorting a subset of windings of the number of windings; determining a resistance value for the motor; selectively adjusting the resistance value based on a number of windings associated with the subset of windings; and providing, in series with the subset of windings, at least one metal-oxide-semiconductor field-effect transistor (MOSFET) configured to: vary the resistance associated with the subset of windings based on a vehicle speed; and tune a damping characteristic associated with the handwheel actuator.

In some embodiments, the at least one MOSFET includes a depletion/enhanced mode MOSFET. In some embodiments, the motor includes a 9/6 motor. In some embodiments, the motor includes a 12/8 motor. In some embodiments, the motor includes a permanent magnet synchronous machine. In some embodiments, the motor includes a surface mounted permanent magnet synchronous machine.

In some embodiments, a system for passive damping in a steer-by-wire handwheel actuator includes a processor and a memory. The memory includes instructions that, when executed by the processor, cause the processor to: select a number of windings for a motor of a handwheel actuator; short a subset of windings of the number of windings; determine a resistance value for the motor; selectively adjust the resistance value based on a number of windings associated with the subset of windings; and provide, in series with the subset of windings, at least one metal-oxide-semiconductor field-effect transistor (MOSFET) configured to: vary the resistance associated with the subset of windings based on a vehicle speed; and tune a damping characteristic associated with the handwheel actuator.

In some embodiments, the at least one MOSFET includes a depletion/enhanced mode MOSFET. In some embodiments, the motor includes a 9/6 motor. In some embodiments, the motor includes a 12/8 motor. In some embodiments, the motor includes a permanent magnet synchronous machine. In some embodiments, the motor includes a surface mounted permanent magnet synchronous machine.

In some embodiments, a method for passive damping in a steer-by-wire handwheel actuator includes winding a first coil around a first tooth of a motor, winding a second coil around first tooth of the motor, and shorting the second coil to one of an internal aspect of the motor and an external aspect of the motor.

In some embodiments, the first coil is larger than the second coil. In some embodiments, a number of serial paths of the first coil is different from a number of serial paths of the second coil. In some embodiments, a number of parallel paths of the first coil is different from a number of parallel paths of the second coil. In some embodiments, a number of turns of the first coil is different from a number of turns of the second coil. In some embodiments, shorting the second coil to one of the internal aspect of the motor and the external aspect of the motor includes directly shorting the second coil. In some embodiments, shorting the second coil to one of the internal aspect of the motor and the external aspect of the motor includes shorting the second coil through a power resistor network. In some embodiments, the motor includes a 9/6 motor. In some embodiments, the motor includes a 12/8 motor. In some embodiments, the motor includes a permanent magnet synchronous machine.

In some embodiments, a system for passive damping in a steer-by-wire handwheel actuator, includes a first coil wound around a first tooth of a motor and a second coil would around first tooth of the motor. The second coil is shorted to one of an internal aspect of the motor and an external aspect of the motor.

In some embodiments, the first coil is larger than the second coil. In some embodiments, a number of serial paths of the first coil is different from a number of serial paths of the second coil. In some embodiments, a number of parallel paths of the first coil is different from a number of parallel paths of the second coil. In some embodiments, a number of turns of the first coil is different from a number of turns of the second coil. In some embodiments, the second coil is directly shorted to one of the internal aspect of the motor and the external aspect of the motor. In some embodiments, the second coil is shorted to one of the internal aspect of the motor and the external aspect of the motor through a power resistor network. In some embodiments, the motor includes a 9/6 motor. In some embodiments, the motor includes a 12/8 motor. In some embodiments, the motor includes a permanent magnet synchronous machine.

In some embodiments, a method for passive damping in a handwheel actuator includes selecting a number of windings for a motor of a handwheel actuator, and shorting a subset of windings of the number of windings, each winding of the subset of windings being disposed at an obtuse angle from each other winding of the subset of windings. The method also includes determining a resistance value for the motor, selectively adjusting the resistance value based on a number of windings associated with the subset of windings, and providing, in series with the subset of windings, at least one metal-oxide-semiconductor field-effect transistor (MOSFET) configured to: vary the resistance associated with the subset of windings based on a vehicle speed; and tune a damping characteristic associated with the handwheel actuator.

In some embodiments, the at least one MOSFET includes a depletion/enhanced mode MOSFET. In some embodiments, the motor includes a 9/6 motor. In some embodiments, the motor includes a 12/8 motor. In some embodiments, the motor includes a permanent magnet synchronous machine. In some embodiments, the motor includes a surface mounted permanent magnet synchronous machine. In some embodiments, the obtuse angle includes a 120 degree angle.

In some embodiments, a system for passive damping in a handwheel actuator includes a processor, and a memory. The memory includes instructions that, when executed by the processor, cause the processor to: select a number of windings for a motor of a handwheel actuator; short a subset of windings of the number of windings, each winding of the subset of windings being disposed at an obtuse angle from each other winding of the subset of windings; determine a resistance value for the motor; selectively adjust the resistance value based on a number of windings associated with the subset of windings; and provide, in series with the subset of windings, at least one metal-oxide-semiconductor field-effect transistor (MOSFET) configured to: vary the resistance associated with the subset of windings based on a vehicle speed; and tune a damping characteristic associated with the handwheel actuator.

In some embodiments, the at least one MOSFET includes a depletion/enhanced mode MOSFET. In some embodiments, the motor includes a 9/6 motor. In some embodiments, the motor includes a 12/8 motor. In some embodiments, the motor includes a permanent magnet synchronous machine. In some embodiments, the motor includes a surface mounted permanent magnet synchronous machine. In some embodiments, the obtuse angle includes a 120 degree angle.

In some embodiments, an apparatus for passive damping in a handwheel actuator includes a processor, and a memory. The memory includes instructions that, when executed by the processor, cause the processor to: short a subset of windings of selected number of windings of a motor of a handwheel actuator, each winding of the subset of windings being disposed at an obtuse angle from each other winding of the subset of windings; selectively adjusting a resistance value of the motor based on a number of windings associated with the subset of windings; and providing, in series with the subset of windings, at least one metal-oxide-semiconductor field-effect transistor (MOSFET) configured to vary the resistance associated with the subset of windings based on a vehicle speed.

In some embodiments, the MOSFET is further configured to tune a damping characteristic associated with the handwheel actuator. In some embodiments, the at least one MOSFET includes a depletion/enhanced mode MOSFET. In some embodiments, the motor includes a 9/6 motor. In some embodiments, the motor includes a 12/8 motor. In some embodiments, the obtuse angle includes a 120 degree angle.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method for passive damping in a handwheel actuator, the method comprising:
   selecting a number of windings for a motor of a handwheel actuator;
   shorting a subset of windings of the number of windings, each winding of the subset of windings being disposed at an obtuse angle from each other winding of the subset of windings;
   determining a resistance value for the motor;
   selectively adjusting the resistance value based on a number of windings associated with the subset of windings; and
   providing, in series with the subset of windings, at least one metal-oxide-semiconductor field-effect transistor (MOSFET) configured to:
      vary the resistance associated with the subset of windings based on a vehicle speed; and
      tune a damping characteristic associated with the handwheel actuator.

2. The method of claim 1, wherein the at least one MOSFET includes a depletion/enhanced mode MOSFET.

3. The method of claim 1, wherein the motor includes a 9/6 motor.

4. The method of claim 1, wherein the motor includes a 12/8 motor.

5. The method of claim 1, wherein the motor includes a permanent magnet synchronous machine.

6. The method of claim 1, wherein the motor includes a surface mounted permanent magnet synchronous machine.

7. The method of claim 1, wherein the obtuse angle includes a 120 degree angle.

8. A system for passive damping in a handwheel actuator, the system comprising:
   a processor; and
   a memory including instructions that, when executed by the processor, cause the processor to:

select a number of windings for a motor of a handwheel actuator;
short a subset of windings of the number of windings, each winding of the subset of windings being disposed at an obtuse angle from each other winding of the subset of windings;
determine a resistance value for the motor;
selectively adjust the resistance value based on a number of windings associated with the subset of windings; and
provide, in series with the subset of windings, at least one metal-oxide-semiconductor field-effect transistor (MOSFET) configured to:
   vary the resistance associated with the subset of windings based on a vehicle speed; and
   tune a damping characteristic associated with the handwheel actuator.

9. The system of claim 8, wherein the at least one MOSFET includes a depletion/enhanced mode MOSFET.

10. The system of claim 8, wherein the motor includes a 9/6 motor.

11. The system of claim 8, wherein the motor includes a 12/8 motor.

12. The system of claim 8, wherein the motor includes a permanent magnet synchronous machine.

13. The system of claim 8, wherein the motor includes a surface mounted permanent magnet synchronous machine.

14. The system of claim 8, wherein the obtuse angle includes a 120 degree angle.

15. An apparatus for passive damping in a handwheel actuator, the apparatus comprising:
   a processor; and
   a memory including instructions that, when executed by the processor, cause the processor to:
      short a subset of windings of selected number of windings of a motor of a handwheel actuator, each winding of the subset of windings being disposed at an obtuse angle from each other winding of the subset of windings;
      selectively adjusting a resistance value of the motor based on a number of windings associated with the subset of windings; and
      providing, in series with the subset of windings, at least one metal-oxide-semiconductor field-effect transistor (MOSFET) configured to vary the resistance associated with the subset of windings based on a vehicle speed.

16. The apparatus of claim 15, wherein the MOSFET is further configured to tune a damping characteristic associated with the handwheel actuator.

17. The apparatus of claim 15, wherein the at least one MOSFET includes a depletion/enhanced mode MOSFET.

18. The apparatus of claim 15, wherein the motor includes a 9/6 motor.

19. The apparatus of claim 15, wherein the motor includes a 12/8 motor.

20. The apparatus of claim 15, wherein the obtuse angle includes a 120 degree angle.

* * * * *